(12) United States Patent
Muschielok et al.

(10) Patent No.: US 10,175,505 B2
(45) Date of Patent: Jan. 8, 2019

(54) OPHTHALMIC LENS FOR PRESBYOPIA CORRECTION

(71) Applicant: Rodenstock GmbH, Munich (DE)

(72) Inventors: Adam Muschielok, Munich (DE); Wolfgang Becken, Munich (DE); Helmut Altheimer, Baisweil-Lauchdorf (DE); Gregor Esser, Munich (DE); Edda Wehner, Emmering (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 15/129,036

(22) PCT Filed: Mar. 19, 2015

(86) PCT No.: PCT/EP2015/000604
§ 371 (c)(1),
(2) Date: Sep. 26, 2016

(87) PCT Pub. No.: WO2015/144299
PCT Pub. Date: Oct. 1, 2015

(65) Prior Publication Data
US 2017/0108711 A1    Apr. 20, 2017

(30) Foreign Application Priority Data
Mar. 26, 2014 (DE) .......... 10 2014 004 381

(51) Int. Cl.
G02C 7/04       (2006.01)
G02C 7/06       (2006.01)
G02C 7/02       (2006.01)

(52) U.S. Cl.
CPC .......... G02C 7/061 (2013.01); G02C 7/028 (2013.01); G02C 2202/12 (2013.01); G02C 2202/20 (2013.01); G02C 2202/22 (2013.01)

(58) Field of Classification Search
CPC .......... G02C 7/06–7/068; G02C 7/051–7/043; G02C 2202/20
(Continued)

(56) References Cited

U.S. PATENT DOCUMENTS 8,317,321 B2    11/2012   Haddock et al.
2006/0055883 A1*  3/2006   Morris ............ A61F 2/1613
                                                        351/159.44
(Continued)

FOREIGN PATENT DOCUMENTS

EP      1891912 A1      2/2008
JP      2009-069462 A   4/2009
JP      2010-522903 A   7/2010

OTHER PUBLICATIONS

European Patent office, International Search Report issued for PCT/EP2015/000604, dated Jun. 25, 2015.
(Continued)

Primary Examiner — Robert E Tallman
(74) Attorney, Agent, or Firm — Schiff Hardin LLP

(57) ABSTRACT

An ophthalmic lens for presbyopia correction, having at least one diffractive structure, wherein the diffractive structure has at least one region of variable diffraction efficiency in which the diffraction efficiency of at least one diffraction order of the diffractive structure that contributes to the focal power of the lens varies depending on the visual point on the ophthalmic lens.

15 Claims, 14 Drawing Sheets

Figure 4A:
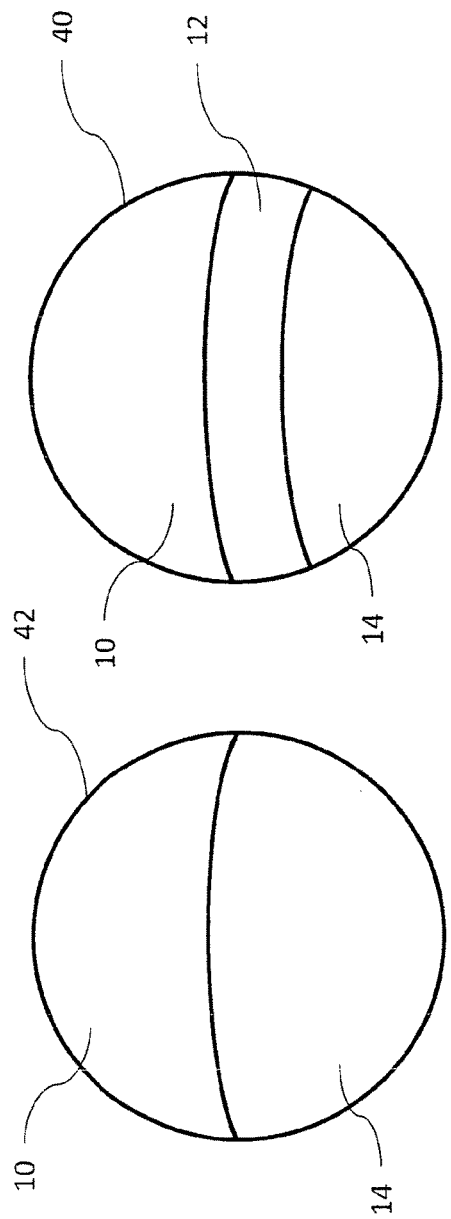

(58) Field of Classification Search
USPC .......................... 351/159.01, 159.41–159.48, 351/159.73–159.77
See application file for complete search history.

(56) References Cited

U.S. PATENT DOCUMENTS

| | | | |
|---|---|---|---|
| 2008/0273169 A1* | 11/2008 | Blum | G02C 7/06 351/159.44 |
| 2009/0046349 A1* | 2/2009 | Haddock | G02B 5/1895 359/319 |
| 2010/0238400 A1 | 9/2010 | Volk | |
| 2013/0261782 A1 | 10/2013 | Becken et al. | |

OTHER PUBLICATIONS

Office Action dated Sep. 25, 2018 for Japanese Application No. 2016-558658 (with English translation).

* cited by examiner

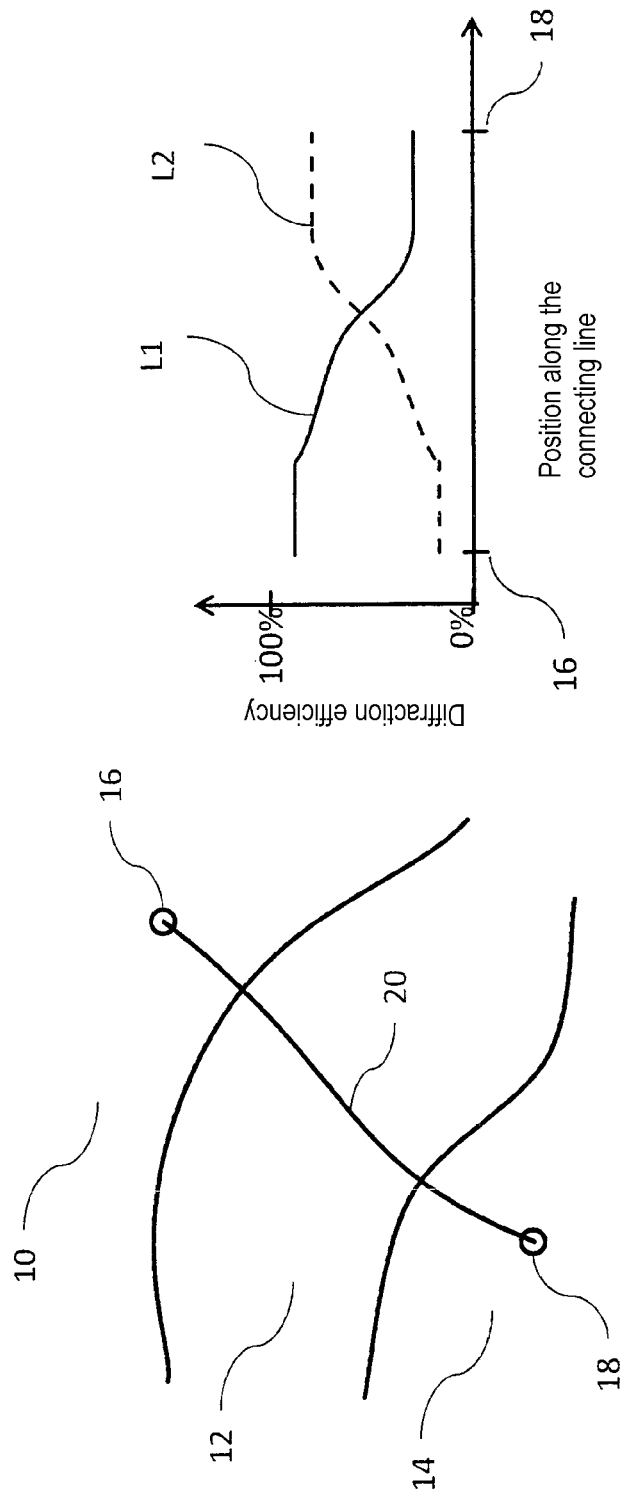

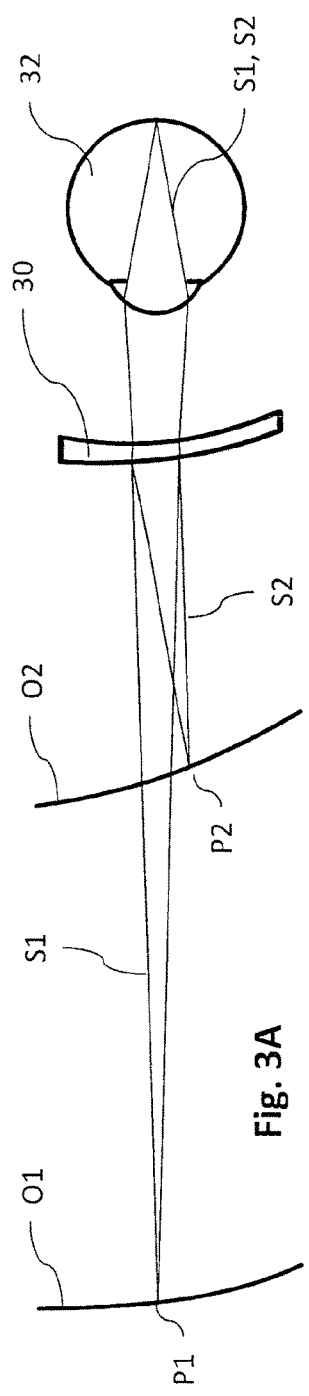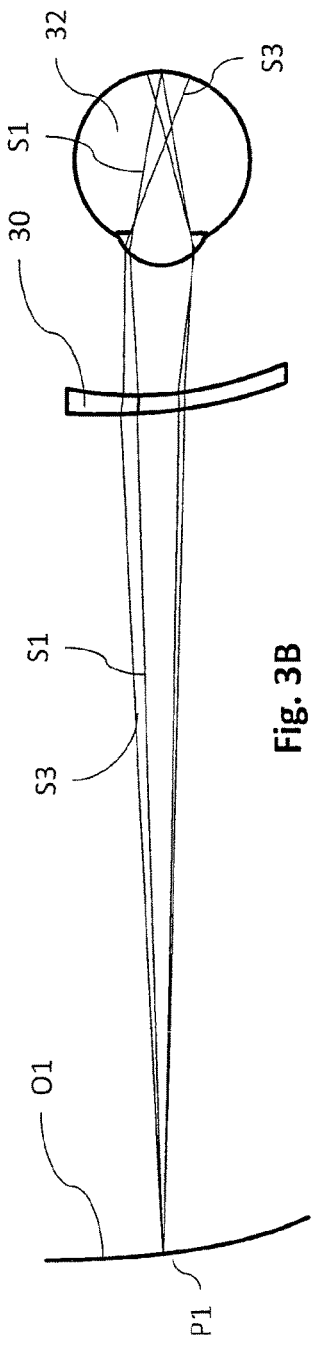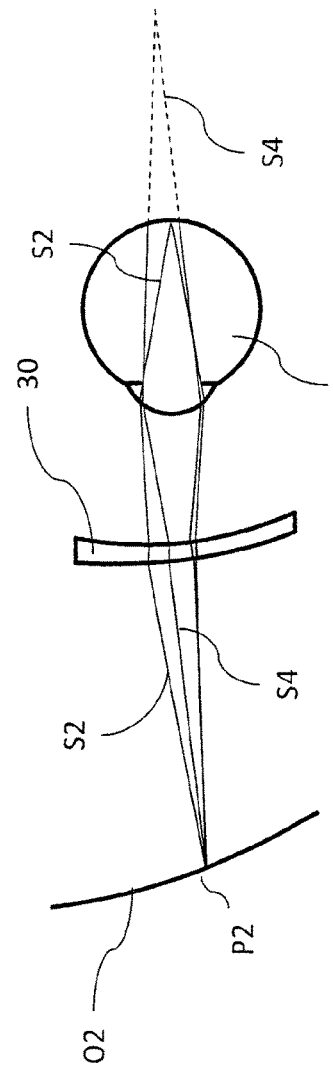

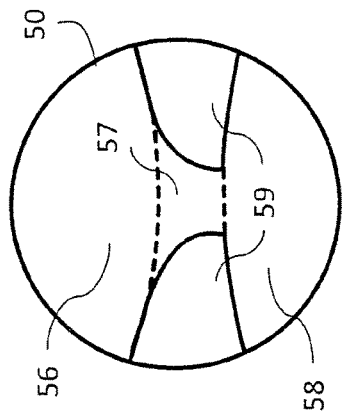 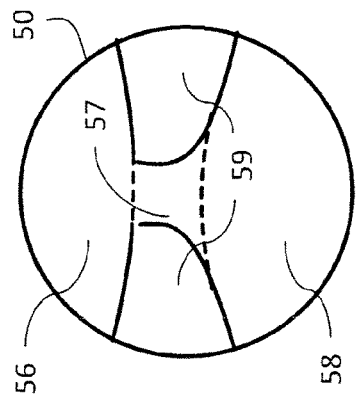 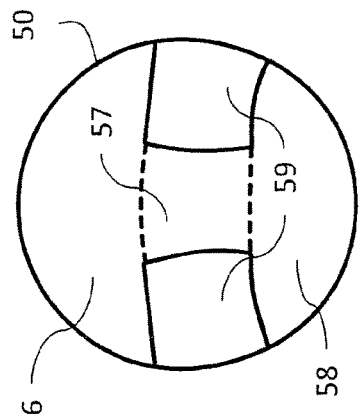
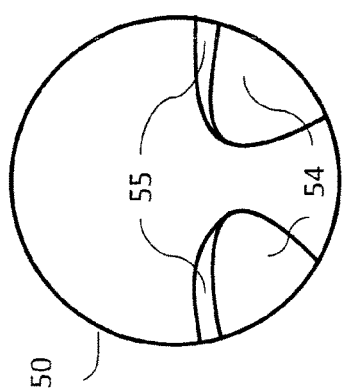 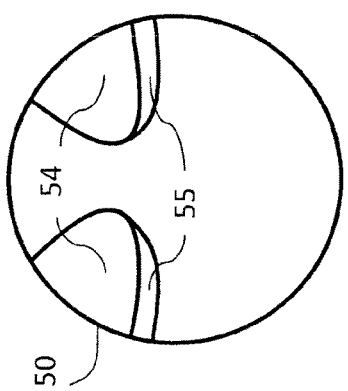 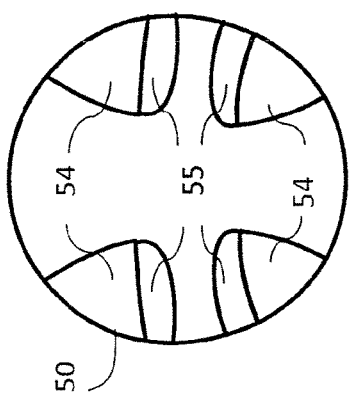
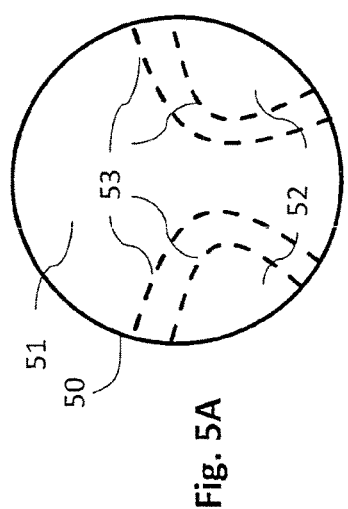 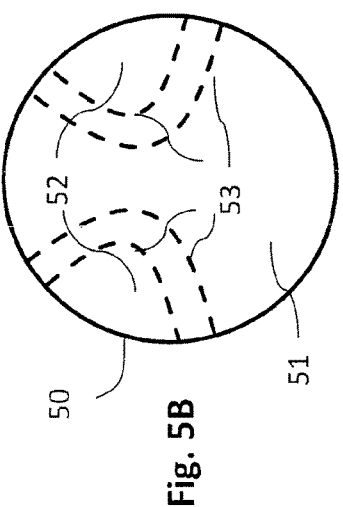 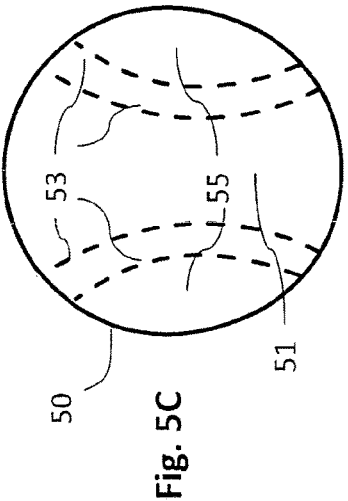
Fig. 5A  Fig. 5B  Fig. 5C

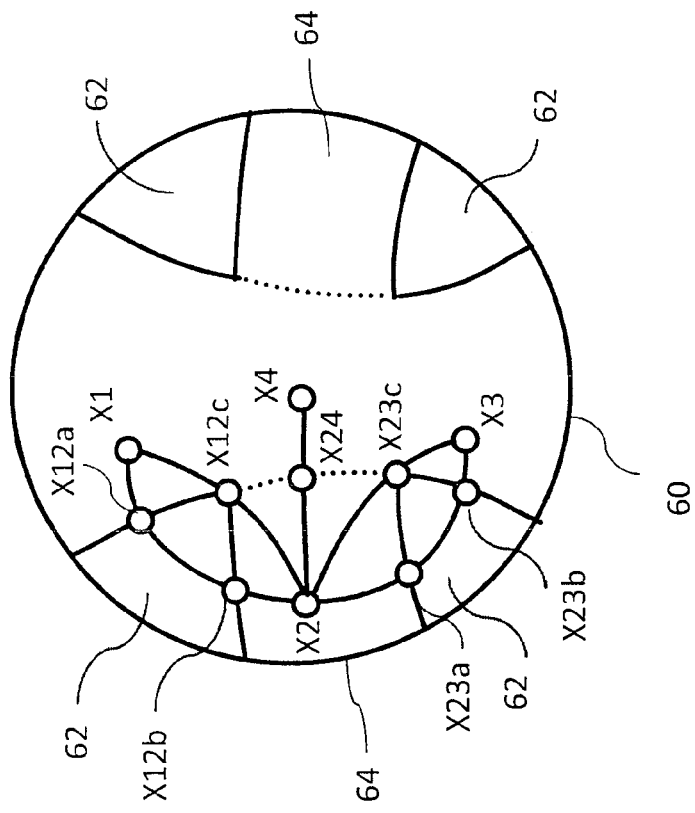
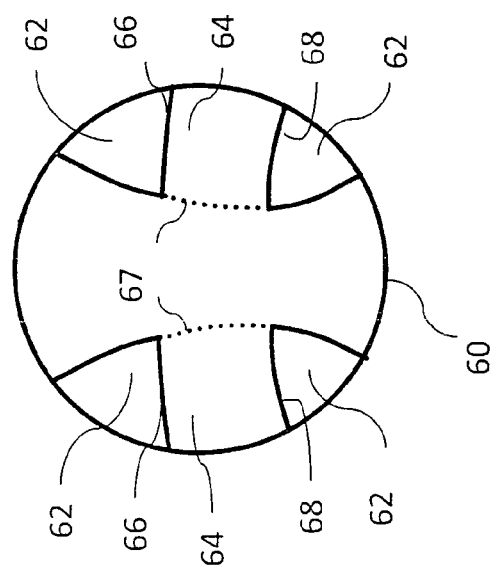
Fig. 6B
Fig. 6A

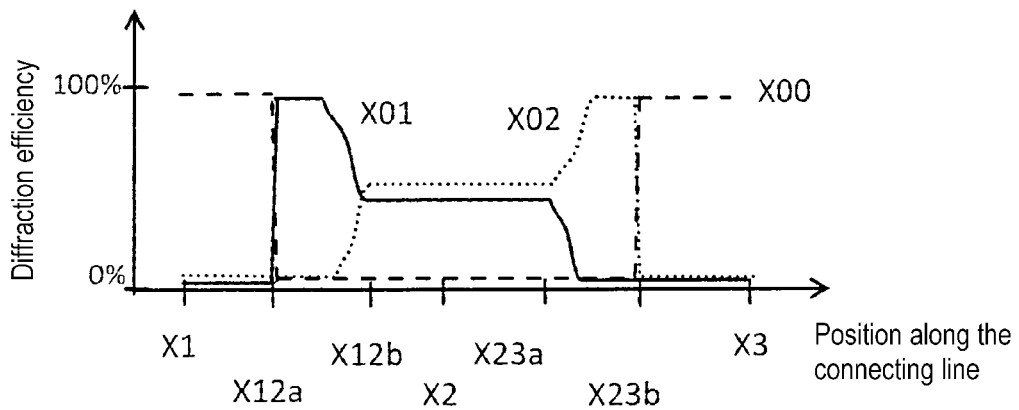
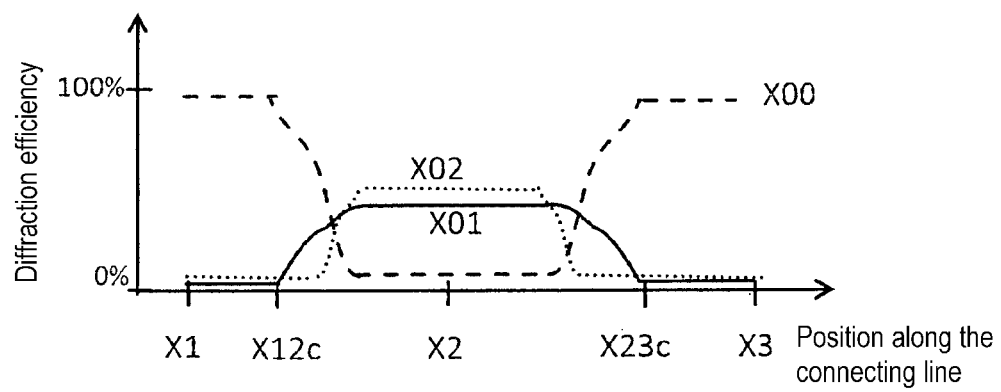
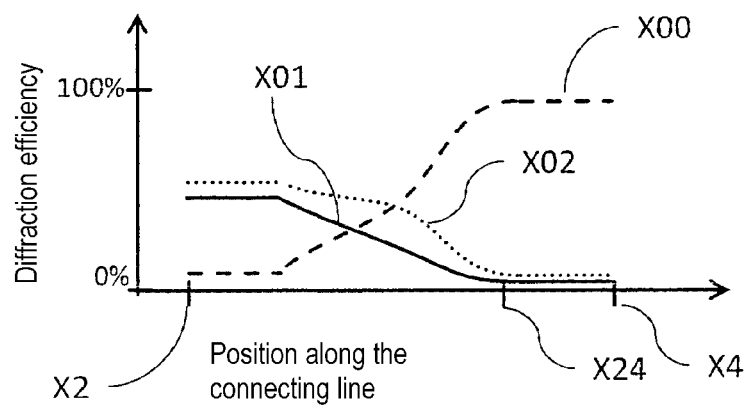
Fig. 6C

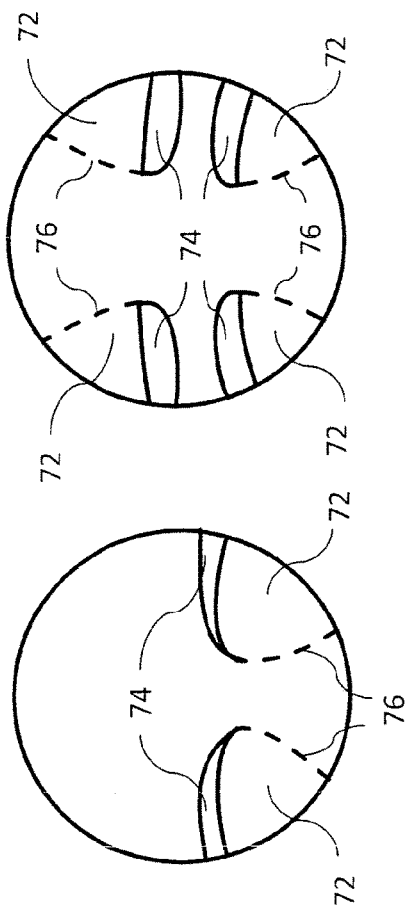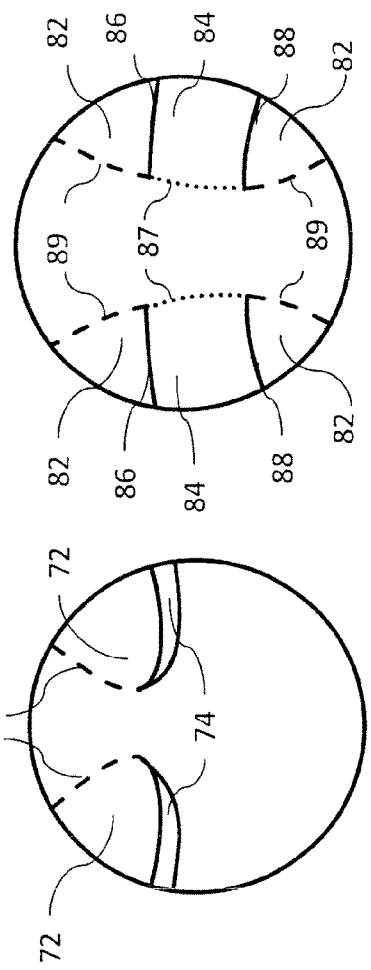
Fig. 7A  Fig. 7B  Fig. 7C  Fig. 7D

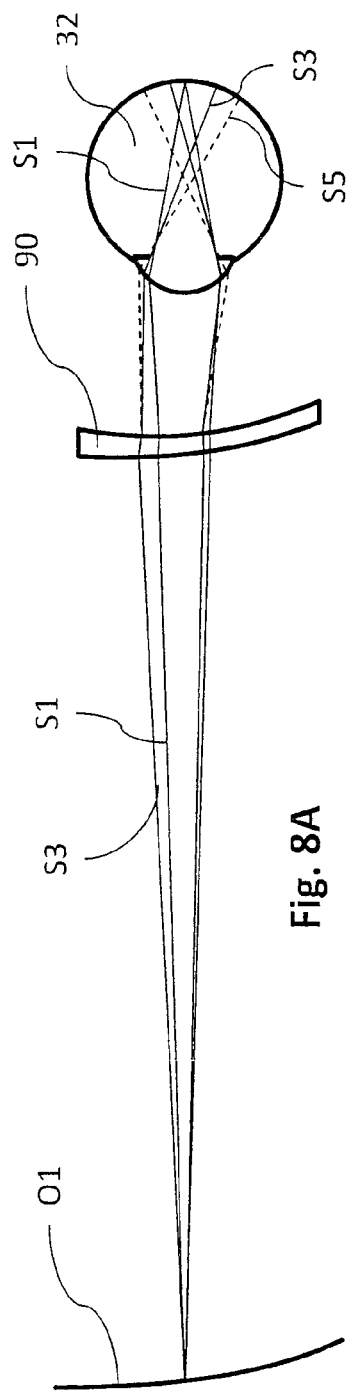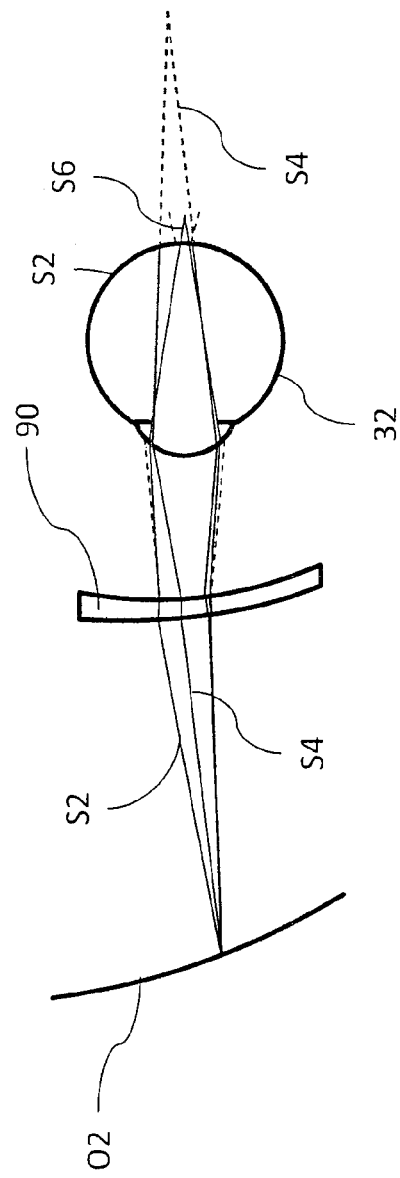

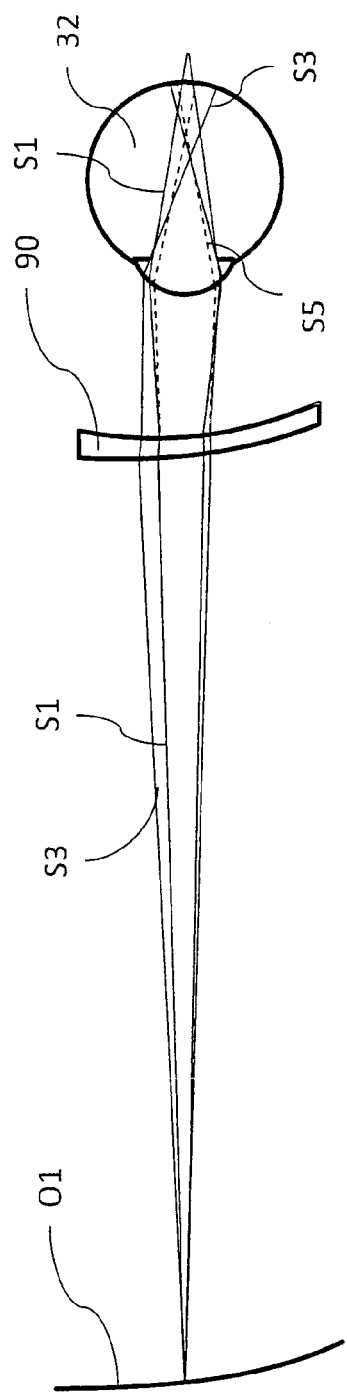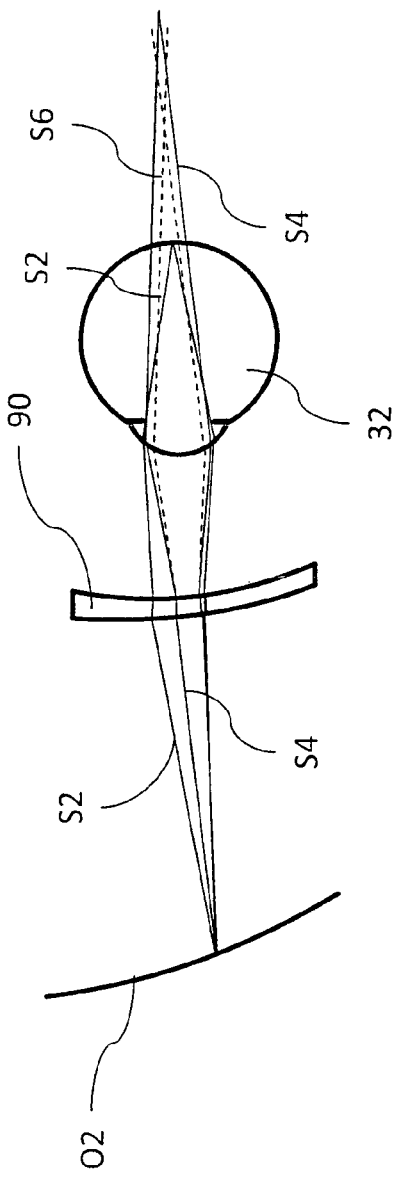
Fig. 9A
Fig. 9B

OPHTHALMIC LENS FOR PRESBYOPIA CORRECTION

The invention concerns ophthalmic lenses for presbyopia correction and methods for optimizing and producing ophthalmic lenses for presbyopia correction.

Ophthalmic lenses for presbyopia correction include multifocal contact lenses and eyeglass lenses such as, for example, bifocal lenses, multifocal lenses or varifocal lenses. Each of these correction means thereby has a range of advantages and disadvantages.

Bifocal lenses and trifocal lenses form a sharp and high-contrast image at two (bifocal lenses) or three (trifocal lenses) object distances. Such lenses have two or three viewing regions (far- and near-sighted regions with bifocal lenses and far-, intermediate- and near-sighted regions given trifocal lenses) in which respective objects may be sharply imaged at a single distance. The wearer of bi- or trifocal glasses may choose one of the main viewing regions by moving his gaze. However, bifocal and trifocal lenses have the disadvantage that they do not enable sharp images for all object distances. An additional disadvantage is the conspicuous prismatic jump—which is perceived by many to be unaesthetic—that is created at the boundaries of the viewing regions in that the curvatures of the lens surface cannot continuously transition into one another everywhere.

Although multifocal contact lenses have the advantage of enabling a sharp image simultaneously at multiple object distances, independently of the viewing direction, the contrast of these images is likewise attenuated in all viewing directions since the intensity of the incident light must be distributed among multiple focal lengths. The contrast reduction materializes primarily in blurry images that are perceived simultaneously with the sharp image of an object. If a diffractive structure is used to generate the different focal lengths, light that is additionally diffusely scattered by the diffractive structure may lead to a further contrast reduction, and a longitudinal chromatic aberration may be generated. The persistent perception of an image with low contrast may be perceived by the wearer of multifocal contact lenses to be interfering or taxing, and is a disadvantage of multifocal contact lenses.

Varifocal lenses have one or more continuously progressive refractive surfaces that enable a sharp and high-contrast image in the major viewing regions (far, intermediate and near-viewing region). Objects are thereby sharply imaged at a respective single distance; however, the distance is dependent on the viewing location or viewing direction. The wearer of varifocal eyeglasses may continuously adjust the object distance of sharply depicted objects by lowering his gaze. Varifocal lenses also have no unaesthetic transitions of the focal power. However, a peripheral astigmatism to the side of the major viewing regions inevitably occurs due to the continuous increase of the effect in a varifocal lens, and—also connected with this—due to a continuous object distance function. This peripheral astigmatism reduces the seeing sharpness upon looking to the side of the major viewing regions and leads to distortions that may lead to intolerance with wearers of varifocal eyeglasses. The peripheral astigmatism is therefore a great disadvantage of varifocal eyeglasses.

In EP 0 967 509 B1 it is proposed to realize three different focal power curves between the far portion and the near portion via combination of diffractive and refractive focal powers in one eyeglass lens. However, each of these focal power curves inevitably generates peripheral blurry regions, as this is also the case given a conventional varifocal lens.

In EP 2 175306 B1 and EP 2 175307 A1, ophthalmic lenses are described that allow sharp vision at two different object distances at the same visual point, which is sought via a division of the glass into multiple focal power regions that alternate with one another. However, the peripheral astigmatism of a varifocal lens is not eliminated with this since there is, for at least one of the object distance functions, a continual transition of the focal power within one of the focal power regions. Furthermore, discontinuities at the boundaries of the focal power regions inevitably lead to light scatter, which negatively affects the visual impression.

EP 2 171 526 A4 shows a varifocal lens that possesses an additional diffractive structure in the near vision region. Although the diffractive structure somewhat reduces the astigmatism present in the lens, this is not eliminated. In addition to this, the diffractive structure degrades the viewing quality in the near vision region since light scatter, chromatic aberration and secondary images occur. The latter are due to the residual intensity of the light passing through the lens, which intensity remains in the 0th diffraction order. Chromatic aberration and secondary images may prove to be interfering most of all given visual impressions with high contrast, for example upon reading or observing bright objects.

A chromatic aberration—meaning transversal as well as longitudinal chromatic aberration—that is expressed in color fringes, for example, occurs in all ophthalmic lenses, but most of all in eyeglass lenses as they have been mentioned above by way of example. The color fringes thereby occur more intensely in the periphery of the ophthalmic lenses and may lead to a degradation of the visual impression, most of all given high plus or minus effects.

It is the object of the present invention to improve the visual impression through an ophthalmic lens for presbyopia correction.

In particular, it is a sub-object of the invention to achieve a continual transition of the focal power within the ophthalmic lens, and thereby at the same time to avoid or conceal unaesthetic prismatic transitions. It is an additional sub-object to avoid or reduce the strength of the impression and/or the size of the area of unwanted peripheral blurry regions for at least one light wavelength and object distance. It is an additional sub-object to reduce the chromatic aberration which is present given a purely diffractive or purely refractive ophthalmic lens. What is understood by the term "chromatic aberration" is the transversal and/or longitudinal chromatic aberration. The transversal chromatic aberration primarily leads to color fringes upon viewing through an ophthalmic lens, such that a reduction of the chromatic aberration is important for an optimal visual impression. The wearing comfort and the visual quality upon viewing through an ophthalmic lens are improved with the achievement of at least one of the sub-objects, and the likelihood of intolerances is reduced.

The above objects are achieved via the combination of a suitable distribution of the focal power of the refractive surfaces (refractive focal power portion) with at least one suitably designed diffractive structure that amounts [sic] to the focal power of the ophthalmic lens.

According to a first aspect of the invention, an ophthalmic lens for presbyopia correction with at least one diffractive structure is provided. The diffractive structure has at least one region of variable diffraction efficiency in which the diffraction efficiency of at least one diffraction order of the diffractive structure that contributes to the focal power of the lens is spatially variable, meaning that it varies depending on the visual point on the ophthalmic lens. The diffraction efficiency of the at least one diffraction order may in particular be chosen so that the object distance model is a relation, meaning that multiple object vergences may be associated with one visual point, such that a sharp image or sharp seeing is possible at least at one object distance.

The ophthalmic lens for presbyopia correction may be a multifocal contact lens, a multifocal eyeglass lens (for example bifocal lens, trifocal lens) or a progressive eyeglass lens. The ophthalmic lens is preferably a progressive eyeglass lens in which the focal power (i.e. the refractive portion of the focal power of the lens) changes continuously along a connecting line between a far reference point and a near reference point.

The diffractive structure may alternatively or additionally have at least one region of variable diffractive focal power in which the focal power of at least one diffraction order of the diffractive structure is spatially variable, meaning that it varies depending on the visual point on the ophthalmic lens. The total focal power of the lens in this region may thereby likewise be spatially variable or essentially constant. The region of variable diffraction efficiency or the region of variable diffractive focal power may overlap at least partially or entirely.

Given the design of ophthalmic lenses for presbyopia correction, the combination of a refractive structure with a diffractive structure having variable diffraction efficiency and/or focal power offers additional degrees of freedom that may be used to improve seeing properties of ophthalmic lenses. With the ophthalmic lens according to the first aspect of the invention, it is thus possible to reduce imaging errors (for example unwanted astigmatism, prismatic discontinuities etc.) and/or chromatic errors of the ophthalmic lens. In particular, it is possible to at least partially compensate for the unwanted astigmatisms of the refractive focal power portion that occur peripherally given progressive eyeglass lenses (for example 0.2 dpt in at least one diffraction order).

The variation of the diffraction efficiency and/or of the focal power may be continuous or discontinuous. The variation of the diffraction efficiency and/or of the diffractive focal power is preferably continuous.

The diffractive structure may be a diffraction grating (for example an amplitude and/or phase grating), in particular a saw tooth grating or blazed grating, a transmission grating or holographic grating, or may comprise such a diffraction grating. The diffractive structure may likewise be or comprise a diffraction grating which is realized via a layer or film with varying diffraction index (gradient index material). The diffractive grating may be both a finely structured diffraction grating and a coarsely structured diffraction grating (for example MOD=Multi-Order Diffraction Grating). One or more of the refractive surfaces of the ophthalmic lens may have diffractive structures. The at least one diffractive structure may thus be arranged or attached on or in the forward and/or rear face of the ophthalmic lens. It is also possible to provide a compound system which is made up of a base lens and a cover lens, wherein the at least one diffractive structure is applied onto the protected inner of the base lens and/or of the cover lens (i.e. the sides of the base lens and/or of the cover lens that are situated in opposition).

Alternatively, the materials which form or demarcate the diffraction grating may be static or, for example, may be electrically switchable. Methods to produce static or switchable diffraction gratings are known from the prior art.

The ophthalmic lens for presbyopia correction (for example a bifocal, trifocal or progressive eyeglass lens or a multifocal contact lens) comprises at least two regions of different focal power that are respectively designed for seeing at different distances. The ophthalmic lens may be a lens with curved diffractive surfaces or a gradient index lens. Given a progressive lens, the curve of the focal power may be arbitrary and depend on the intended application of the lens (for example primarily for seeing far, near, at middle distances) and/or the design concept (soft design, hard design etc.).

Diffraction properties of an ophthalmic lens that are to be ascribed to the optical refraction between media of different refraction indices are typically described with a variation of sphere, cylinder and/or axis. The sphere, cylinder and axis may be surface properties or properties in the usage position of the ophthalmic lens. The sphere, cylinder and/or axis may vary depending on the visual point. The sphere, cylinder and/or axis may also change depending on the usage position in which the lens is used. At least the sphere or the spherical equivalent preferably changes depending on the visual point, and if applicable on the usage position of the lens. The (purely) refractive focal power of an ophthalmic lens, which is composed of sphere, cylinder and/or axis, may be described by means of a focal power vector having the components $M\_ref$, $J0\_ref$ and $J45\_ref$, wherein $M\_ref$ designates the spherical equivalent and $J0\_ref$ and $J45\_ref$ designate the astigmatic components.

If the focal power of the n-th diffraction order of the diffractive structure—i.e. the diffractive focal power portion that arises due to the diffraction of the light in the n-th order upon passage through the diffractive structure—is considered, the equivalent to refractive ophthalmic lenses having a spherical equivalent $M\_n\_diff$, as well as having two astigmatic components $J0\_n\_diff$ and $J45\_n\_diff$, may be described. In general, "n" stands for an arbitrary diffraction order of a diffractive structure. In the borderline case of a 1-dimensional grating, "n" may be represented as a whole number; given 2-dimensional diffractive elements, "n" may be represented as a tuple of two whole numbers. The proportion of the incident light that is diffracted at the diffractive structure in the n-th order is thereby described by the diffractive efficiency $eta\_n$.

At each point of an ophthalmic lens having a diffractive structure, the entire focal power of the lens for the light diffracted in a specific diffraction order is composed of the focal power contributions of the refractive surfaces (refractive focal power) and the focal power contribution of the diffractive structure (diffractive focal power). According to one aspect of the invention, the diffraction efficiency and/or the focal power of at least an n-th diffraction order of the diffractive structure are controlled depending on the visual point through the diffractive structure. The diffraction efficiency and the focal power may thereby be controlled or varied largely independently of one another.

The focal power portion, or the focal power of the n-th diffraction order of the diffractive structure ($M\_n\_diff$, $J0\_n\_diff$, $J45\_n\_diff$), may thereby be constant across the entire diffractive structure or only across portions of the diffractive structure, or may vary depending on the visual point, wherein such a variation may be both continuous and discontinuous.

The diffractive focal power portion, or the focal power of a diffraction order, may be varied via a suitable change to the periodicity of the diffractive structure depending on the visual point. If the change of the periodicity of the grid takes place to a uniformly large extent in all directions, starting from a visual point, a spherical focal power is generated. If the diffractive grating is described by means of a phase function (see for example the phase function introduced in the publication WO 2012/065738), the phase function in this case exhibits the same curvatures at every point. In this case, the focal power contribution of the diffractive structure to the total focal power of the ophthalmic lens is constant. If the change to the periodicity of the grating takes place to differently large extents in two different directions, starting from one visual point, an additional astigmatic focal power contribution may be generated, wherein the position of the axis of the astigmatism generated in such a manner may also be controlled or varied. Via a change to the local periodicity of the diffractive grating, an arbitrary desired change of the focal power contribution of the diffractive structure may be achieved in order to specifically manipulate the refraction properties of an ophthalmic lens with diffractive structures.

The diffraction efficiency of the light diffracted by the diffractive structure in a diffraction order may be controlled via suitable design of the diffractive structure, as independently as possible from its focal power curve, wherein only the sum of the intensities of the light diffracted in all diffraction orders, together with the scatter losses, yields the intensity of the incident light. For example, the diffraction efficiency may be influenced by what is known as blazing. What is known as a saw tooth or blaze grating (i.e. a grating with a saw tooth-like profile) may thus be used as a diffractive structure. The portion of the light in a specific diffraction order (i.e. the diffraction efficiency for a specific diffraction order) may be varied via a variation of the angle between the blaze surface and the substrate (i.e. of the blaze angle).

An additional possibility to influence the diffraction efficiency is to vary the refraction index difference between the two media (that make up the diffractive structure) with the visual position. For example, the refraction index of the base material from which the ophthalmic lens is produced may have a refraction index gradient. A finish or a coating with which the base material is coated may likewise also have a refraction index gradient. Such a finish or such a layer may consist of or comprise liquid crystals which may be additionally polymerized. Such polymerized liquid crystal layers are used in the manufacture of phase plates, for example.

The diffraction efficiency may thereby be constant across the entire diffractive structure or only across portions of the diffractive structure, or may vary depending on the visual point, wherein the variation may be both continuous and discontinuous.

As has already been stated above, the combination of a refractive structure (comprising curved refracting surfaces and/or a refraction index gradient) with a diffractive structure having variable diffraction efficiency and/or focal power has decisive advantages given the design of ophthalmic lenses for presbyopia correction. While the majority of the light is completely refracted at a refractive surface, and only a small portion is lost due to reflection losses, due to the diffraction efficiency and/or the diffractive focal power a diffractive structure of one or more diffraction orders offers additional degrees of freedom that may be used for the improvement of seeing properties of ophthalmic lenses.

For example, the diffractive structure may be designed so that the diffraction efficiency and/or the focal power of the at least one diffraction order of the diffractive structure changes constantly or continuously along a line which connects a first reference point with a second reference point of the lens. For example, the diffraction efficiency of the at least one diffraction order may exhibit a first high value (for example essentially 100%) at a first reference point and drop continuously to a lower value (for example essentially 0%) given constant change along the line connecting the two reference points. If the ophthalmic lens is a progressive lens, this may have at least one connecting line between the far and near reference points, along which connecting line the diffraction efficiency of at least one diffraction order changes continuously.

A novel transition of the focal power between two visual points, or between two areas with different focal power vectors, can be realized with such a diffractive structure which—for example—may be used in the design of ophthalmic lenses in order to avoid blurry regions, distortions or distinct prismatic jumps.

The total focal power of the lens may thus be different at the two reference points. In one example, the focal power of the lens transitions from a first value ($M\_1$, $J0\_1$, $J45\_1$) at the first reference point to a second value ($M\_2$, $J0\_2$, $J45\_2$) at a second reference point. Due to the continuous change of the diffraction efficiency of at least one diffraction order contributing to the focal power of the lens, it is possible to design this transition so that no unwanted blurry regions or distortions are created.

In one example, the first reference point may be a far reference point in which the focal power of the lens amounts to a value suitable for seeing at a far distance or at middle distances. The second reference point may be a near reference point in which the focal power of the lens amounts to a value suitable for seeing at a near distance. The line which connects the two reference points may be a line which connects the visual points (i.e. the piercing points of the visual rays with one of the refractive surfaces of the ophthalmic lens) upon displacement of the gaze (for example upon lowering of the gaze).

A continuous transition of the focal power between two visual points or reference points with different focal power vectors (for example between a far and a near reference point), which continuous transition is known from conventional varifocal lenses, is realized via a continuous focal power curve that is based on the fact that each of the components of the (purely refractive) focal power vector ($M$, $J0$, $J45$) changes continuously given constant change of the visual point. Such a transition exhibits no aesthetically striking prismatic jumps as they are known from bifocal or trifocal lenses. However, an inevitable consequence of such a continuous transition is unwanted blurry regions and distortions in the periphery of the varifocal lens, which is closely connected with what is known as the Minkwitz theorem.

In one example according to the invention (for example given a progressive lens), a continuous focal power curve in the ophthalmic lens may be realized in order to enable a sharp image in a continuous range of object distances, wherein the severity of the unwanted blurry regions occurring at the periphery is reduced. For example, the refractive focal power portion of the region of the ophthalmic lens that is designed for near seeing may thus be designed to be smaller than given a purely refractive lens. The absent spherical effect may be generated via a diffractive structure which is located in the region designed for near seeing, for example. As described above, the diffractive structure may be designed so that the diffraction efficiency of the diffraction order generating the additional effect decreases toward the edge to a small value (preferably 0%), which is why it does not lead to any additional astigmatism at the periphery. Since the diffraction of the spherical portion of the refractive focal power is less than given a conventional, purely refractive lens, the severity of the peripheral unwanted astigmatism is likewise less. The regions of good seeing may thereby be expanded.

The diffractive structure may also be designed so that, in the region of variable diffraction efficiency, the diffraction efficiency of at least one other additional diffraction order varies spatially depending on the visual point on the ophthalmic lens. The additional diffraction order may be a diffraction order that likewise contributes to the focal power of the lens. However, it is possible that the additional diffraction order does not contribute to the focal power of the lens. The two diffraction efficiencies preferably add up to more than 75%, 80%, 90%, 95%, 98% or 99%, or to 100%.

The diffraction efficiency of the first of the at least two diffraction orders may thereby decrease constantly or continuously along the line connecting the reference points, and the diffraction efficiency of the additional line connecting the reference points may increase constantly or continuously. The changes may take place such that the sum of the diffraction efficiency of all diffraction orders remains essentially constant at all points on the line connecting the reference points.

As described above, the diffraction efficiency of the first diffraction order may have a high value at the first reference point and a lower value at a second reference point. The diffraction efficiency of the additional diffraction order may conversely have a low value at a first reference point and a higher value at a second reference point.

In particular, the diffractive structure may have a first region in which a first, n-th diffraction order contributes to the focal power of the lens and has a diffraction efficiency eta_n with a high value (for example essentially 100%). The focal power contribution of the n-th order may be essentially constant. Given constant change of a visual point along the line connecting the reference points, the diffraction efficiency eta_n may be transformed continuously from a higher value to a low value (for example 0%). The diffraction efficiency may increase in the other diffraction orders to the same extent to which the diffraction efficiency eta_n of the n-th diffraction order decreases. In a borderline case, this may thereby be a single different, additional diffraction order m so that the sum of the diffraction efficiencies eta_n and eta_m approaches 100%.

The second diffraction order may make a contribution to the focal power vector of the lens, but does not need to. If the second, m-th diffraction order makes no contribution to the focal power vector of the lens, a constant transition of the diffraction efficiency of the n-th order eta_n to 0% and eta_m to 100% is thus equivalent to a steady disappearance of the diffractive structure.

The first, n-th and second, m-th diffraction order may respectively be the 1st and 0th diffraction order. The 0th diffraction order thereby makes no contribution to the focal power vector of the lens since all components of the diffraction portion of the focal power vector (0, 0, 0) that is associated with the 0th diffraction order are equal to zero. The 1st diffraction order may have a constant focal power contribution or focal power that is independent of the visual location. However, it is also possible that the 1st diffraction order has a focal power that is dependent on the visual location.

If all diffraction orders with diffraction efficiency differing significantly from zero are considered jointly, the object distance area of such an ophthalmic lens is not a function as given a conventional refractive lens but rather a relation, since—given a fixed visual point—the light radiated from objects at multiple object distances may be imaged sharply on the retina via at least one diffraction order. The image perceived by the wearer of such an ophthalmic lens (given steady accommodation) and imaged sharply on the retina—which image is created by the light diffracted in the n-th diffraction order—loses intensity with decreasing diffraction efficiency eta_n. At the same time, the intensity of a blurry image increases, wherein the blurriness is conditional on both aberrations of a second order (defocus and/or astigmatism) and aberrations of higher order (coma, trefoil, spherical aberration etc.). Given steady accommodation and a defined gaze deflection between the first and second reference point, a constant contrast decrease of the sharply formed image therefore results as a seeing impression, which contrast decrease is created by the light diffracted in the n-th diffraction order. However, the reduction of the contrast is perceived to be significantly less interfering than, for example, blurriness caused by unwanted astigmatism, such that the regions in which the ophthalmic lens delivers an image that is deemed to be good for its wearer are relatively large.

Since—given this constant transformation of the diffractive focal power portion between two areas of different focal powers—it is not necessary to constantly transition focal power vectors of each area into one another per component, no additional regions of unwanted astigmatism are introduced via combination of a diffractive structure with a refractive structure. The transition of the focal power that is described above may therefore be used to completely avoid or to reduce distinct prismatic jumps as well as unwanted blurry regions and distortions.

The diffractive structure may also have at least one region of constant diffraction efficiency in which the diffraction efficiency of the at least one diffraction order of the diffractive structure is constant.

The diffractive structure preferably has at least two regions of constant diffraction efficiency in which different diffraction orders respectively have a maximum (for example 100%) diffraction efficiency. The region of variable diffraction efficiency may adjoin the two regions of constant diffraction efficiency. The two regions of different diffraction efficiency may have different focal powers.

The ophthalmic lens (for example a bifocal or a trifocal eyeglass lens) may thus have at least two regions of different focal power in which respectively the 1st or the 0th diffraction order has essentially a 100% diffraction efficiency. The two regions of different focal power may adjoin a region of variable diffraction efficiency in which a continuous transition of the diffraction efficiencies of the two diffraction orders occurs between the value of essentially 0% and the value of essentially 100%. The diffractive focal power portion of the 0th order is zero in the region of constant diffraction efficiency in which the diffraction efficiency of the 0th order is essentially 100%.

The region that has a higher focal power overall and is suitable for near seeing is typically located in the lower part of the ophthalmic lens. The region with the smaller spherical equivalent is located in the upper part of the ophthalmic lens and may be used for seeing at far distances or at middle object distances. A different arrangement is likewise possible, for example for lenses for special applications (for example pilot lenses). Independently of the arrangement of the regions of different focal power, the diffractive structure may make a positive or a negative contribution (for example via the 1st diffraction order) to the middle spherical equivalent, such that the diffractive structure may be located in both the upper part (for example far part) and in the lower part (for example near part) of the ophthalmic lens.

In the above example, the n-th and m-th diffraction orders are respectively the 1st and 0th diffraction orders. However, they may be two arbitrary diffraction orders differing from the 1st and 0th diffraction orders. Such an ophthalmic lens may—as described—have two regions with different focal power in which the diffraction efficiency of precisely one order amounts to essentially 100%, and which border a region of variable diffraction efficiency in which there is a steady transition of the diffraction efficiency.

In the above examples of ophthalmic lenses, a continuous transition is created between two areas or visual points of an ophthalmic lens, given which transition neither a sharply delimited prismatic jump nor additional blurry areas and distortions are generated. It is therefore possible to avoid blurry areas and distortions or to reduce them in comparison to a conventional progressive lens. With regard to the seeing quality, the invention therefore offers advantages relative to conventional bifocal, trifocal and varifocal lenses.

In addition or as an alternative to the avoidance of blurriness and prismatic jumps, the unwanted astigmatism that is already present given a progressive lens may be at least partially compensated for. The refraction value curve of the progressive lens may thereby be arbitrary depending on whether the lens should be used primarily for seeing objects far, near or at middle distances.

According to a second aspect of the invention (that is independent of the first aspect), this may be achieved in that the ophthalmic lens has at least one diffractive structure that is designed to at least partially compensate for the unwanted peripheral astigmatism created by the refractive part of the lens (in particular due to the continuous refractive value curve). The diffractive structure is preferably designed to at least partially compensate for the unwanted astigmatism of the refractive focal power portion of the lens in at least one diffraction order, such that the maximum occurring total astigmatism in the at least one diffraction order is preferably less than 2.5 dpt, 2.0 dpt, 1.5 dpt, 1 dpt, 0.5 dpt, 0.3 dpt or 0.25 dpt, particularly preferably less than 0.2 dpt.

In particular, the diffractive structure has an astigmatic focal power portion which at least partially compensates for the astigmatism of the purely refractive part of the lens. Together, the diffractive and refractive focal power portions yield a combined focal power whose unwanted astigmatism is less than is the case given a purely refractive ophthalmic lens. The phase function of such a diffractive structure is a rotationally asymmetrical phase function. As an example, the rotationally asymmetrical diffractive structure may have elliptical grating lines. Such a diffractive structure is in the position to entirely compensate for the astigmatism locally at one point. However, it is advantageous to compensate for the astigmatism at more than one point, which may be achieved with an asymmetrical diffractive grating.

The periodicity of the diffractive structure may be chosen such that the diffractive structure has a constant or inconstant diffractive focal power. Diffractive structures having constant focal power may exhibit advantages in production. However, the unwanted astigmatism of the refractive part may be better compensated for with an inconstant focal power since, depending on the visual point, a different diffractive effect may be necessary for complete or at least partial compensation of the unwanted refractive astigmatism. Axis position and/or magnitude of the astigmatism of the diffractive focal power portion may thereby be varied.

An example of a compensation of the unwanted peripheral astigmatism is described in the following with a diffractive structure according to one aspect of the invention.

The diffractive structure or the diffraction grating may be described or provided by means of a phase function, for example such as the phase function described in the patent applications WO 2012/065738, EP 2011/005782 and DE 102010051. The phase function $\Psi(x,y)$ describes the effect of a diffraction grating on the wave fronts that describe the light passing through the grating. The contribution of the diffraction grating to the imaging errors of the second order is provided by the second derivatives of the phase function $\Psi^2(x,y)$ that are indicated in Table 2 in WO 2012/065738. The corresponding equation for the power vector of the declining wave front is indicated there as $$T_2 S'^{(2)} = T_2 S^{(2)} + \nu F^{(2)} - \Psi^{(2)}(x,y)$$

The determination of a diffraction grating which at least partially compensates for the unwanted astigmatism may take place as follows, for example:

Step 1: Determination of the Refractive Portion $T_2 S^{(2)} + \nu F^{(2)}$.

If the unwanted astigmatism stemming from the refractive portion should be entirely or partially compensated for, the astigmatism obtained in the vector $$S'^{(2)} = \begin{pmatrix} S'^{(2,0)} & (0,0) \\ S'^{(1,1)} & (0,0) \\ S'^{(0,2)} & (0,0) \end{pmatrix} = \begin{pmatrix} \partial^2 S'(\bar{x}, \bar{y})/\partial \bar{x}^2 \\ \partial^2 S'(\bar{x}, \bar{y})/\partial \bar{x} \partial \bar{y} \\ \partial^2 S'(\bar{x}, \bar{y})/\partial \bar{y}^2 \end{pmatrix} \quad (1)$$

must optimally be equal to the prescription cylinder. More precisely stated, in comparison to the corresponding power vector $$S'^{Presc(2)} = \begin{pmatrix} S'^{Presc(2,0)} & (0,0) \\ S'^{Presc(1,1)} & (0,0) \\ S'^{Presc(0,2)} & (0,0) \end{pmatrix} = \begin{pmatrix} (S+Z/2) - Z/2\cos 2A \\ -Z/2\sin 2A \\ (S+Z/2) + Z/2\cos 2A \end{pmatrix} \quad (2)$$

the difference vector $$\delta S'^{(2)} = S'^{(2)} - S'^{Presc(2)} =: \begin{pmatrix} \delta S'^{(2,0)} & (0,0) \\ \delta S'^{(1,1)} & (0,0) \\ \delta S'^{(0,2)} & (0,0) \end{pmatrix} \quad (3)$$

must be as small as possible.

The S, Z, A are in the simplest case directly the prescription data of the eyeglass wearer, i.e. sphere, cylinder and axis. In the general case, S, Z, A correspond to those values that the local wave front must have in the tangential coordinate system of the area to be considered whose y-axis lies in the local refraction plane, in order to lead to a wave front at the apex ball that corresponds to the prescription data.

The smallness of the components of the vector $\delta S'^{(2)}$ for the contributions of the spherical equivalent and of the astigmatism may be required separately. The astigmatism included in $\delta S'^{(2)}$ is as small as possible if $$\begin{aligned} \mathrm{Ast}(\delta S'^{(2)}) &= \sqrt{(\delta S'^{(2,0)}(0,0) - \delta S'^{(0,2)}(0,0))^2 + 4\delta S'^{(1,1)}(0,0)^2} \\ &= \sqrt{\begin{aligned} &(\delta S'^{(2,0)}(0,0) - \nu F^{(2,0)}(0,0) - \Psi^{(2,0)}(0,0) - \\ &(\delta S'^{(0,2)}(0,0) + \nu F^{(0,2)}(0,0) - \Psi^{(0,2)}(0,0)))^2 + \\ &4(\delta S'^{(1,1)}(0,0) + \nu F^{(1,1)}(0,0) - \Psi^{(1,1)}(0,0))^2 \end{aligned}} \end{aligned} \quad (4)$$

is as small as possible. In the ideal case, $\mathrm{Ast}(\delta S'^{(2)}) = 0$.

In principle, this cannot be achieved via the entire lens. However, it is already worthwhile to achieve the condition Ast($\delta S'^{(2)}$)=0 locally at one or more isolated locations in the eyeglass lens. Surrounding each such location in the lens, the unwanted astigmatism is then at least approximately zero. In the simplest case, a phase function thereby results whose second derivatives at the reference location have fixed values that are provided via the refractive properties at this location.

Step 2

A quadratic phase function then results via integration. Due to the identity $$\Psi(\bar{x}, \bar{y}) = \Psi(0, 0) + \int_0^{\bar{x}} \Psi^{(0,0)}(0, 0) d\bar{x}' + \\ \int_0^{\bar{y}} \Psi^{(0,1)}(0, 0) d\bar{y}' + \int_0^{\bar{x}} \int_0^{\bar{x}'} \Psi^{(2,0)}(\bar{x}'', 0) d\bar{x}'' d\bar{x}' + \\ \int_0^{\bar{y}} \int_0^{\bar{x}} \Psi^{(1,1)}(\bar{x}', 0) d\bar{x}' d\bar{y}' + \int_0^{\bar{y}} \int_0^{\bar{y}'} \Psi^{(0,2)}(\bar{x}, \bar{y}'') d\bar{y}'' d\bar{y}' \tag{5a}$$

that is valid for each (twice continuously differentiable) function, the function $\Psi(\bar{x}, \bar{y})$ may itself be developed via integration from the second derivatives of $\Psi(\bar{x}, \bar{y})$. If the second derivatives are not known as a function $\Psi^{(2,0)}(\bar{x}'', 0) \approx \Psi^{(2,0)}(0,0)$, $\Psi^{(1,1)}(\bar{x}', 0) = \Psi^{(1,1)}(0,0)$, $\Psi^{(0,2)}(\bar{x}, \bar{y}'') = \Psi^{(0,2)}(0,0)$, may be set approximately and $$\Psi(\bar{x}, \bar{y}) = \Psi(0, 0) + (\Psi^{(1,0)}(0, 0))\bar{x} + (\Psi^{(0,1)}(0, 0))\bar{y} + \\ \frac{1}{2}(\Psi^{(2,0)}(0, 0))\bar{x}^2 + (\Psi^{(1,1)}(0, 0))\bar{x}\bar{y} + \frac{1}{2}(\Psi^{(0,2)}(0, 0))\bar{y}^2 \tag{5b}$$

may be obtained.

This may also be written in the form of the function $$\Psi(\bar{x},\bar{y}) = a_{xx}\bar{x}^2 + a_{xy}\bar{x}\bar{y} + a_{yy}\bar{y}^2 + b_x\bar{x} + b_y\bar{y} + c, \tag{6}$$

whose isolines are ellipses and in whose middle point the reference point lies.

Step 3

If the condition according to the above Equation (4) is considered, it is recognized that it is not $\Psi^{(2,0)}(0,0)$ and $\Psi^{(0,2)}(0,0)$ that are both assumed individually but rather only the difference $\Psi^{(2,0)}(0,0) + \Psi^{(0,2)}(0,0)$. This means that an additive constant $\tilde{a}$ in Equation 5a, 5b for $\Psi(\bar{x}, \bar{y})$ in step (2) is even still free, which leads to the presentation of the form $$\Psi(\bar{x},\bar{y}) = (a_{xx}+\tilde{a})\bar{x}^2 + a_{xy}\bar{x}\bar{y} + (a_{yy}+\tilde{a})\bar{y}^2 + b_x\bar{x} + b_y\bar{y} + c. \tag{7}$$

The constant $\tilde{a}$ corresponds to the superposition with a sphere. For example, it may alternatively be set up so that
- the spherical equivalent of the corrected wave front does not change
- or a principal section of the corrected wave front has a curvature of zero
- or the eccentricity of the elliptical isolines of $\Psi(\tilde{x},\tilde{y})$ is set so that it is as advantageous as possible under additional aspects, for example production engineering aspects.

Step 4

If the refractive astigmatism varies surrounding the reference point, the phase function from the solution (5a, 5b) then leads to deviations from the ideal condition Ast ($\delta S'^{(2)}$)=0. In such a case, however, the phase function may be modified so that Ast ($\delta S'^{(2)}$) is as low as possible in a predetermined environment of the reference point. One consequence of this may be that the isolines are no longer elliptical but rather have a more complicated form.

Step 5

The phase function $\Psi(\bar{x}, \bar{y})$ that is to be defined according to steps 1-4 corresponds to a diffraction grating as described in the aforementioned prior art.

Step 6

As desired, the diffraction grating leads to different wave front properties that would be the case without grating. Instead of accepting an abrupt transition at the edge of a region provided with the grating, according to one aspect of the invention the diffraction efficiency of the grating is varied at the edge so that the intensity of the diffraction order that internally achieves the effect described by $\Psi(\bar{x}, \bar{y})$ decreases traveling outward from a maximum value near of 100% to nearly 0%, to the benefit of the intensity in that order m=0 in which the grating introduces no additional effect.

Step 7

If multiple reference points are present on the lens, it is advantageous to avoid an overlap of the different gratings. The described method in particular offers the flexibility to adapt the sizes of the regions to other requirements. In a preferred example, a compensation of the peripheral astigmatism takes place via a respective correction region to the left or right of the progression zone.

In a preferred example, a compensation of the unwanted astigmatism may take place with two diffraction orders differing from the 0th diffraction order and situated orthogonal to one another. In principle, the major sections of the strongest and weakest curvature of the wave front passing through the ophthalmic lens which were generated by the purely refractive effect are orthogonal to one another. Such a compensation of the unwanted astigmatism with two diffraction orders situated orthogonal to one another therefore allows the astigmatism for two different object distances (for example for seeing far and seeing near) to be compensated for.

In particular, it is possible to compensate for the astigmatism for an object distance entirely or partially in that a diffractive effect is generated by one of the diffraction orders (for example the order (1, 0)), which diffractive effect adapts the curvature of the wave front in the more weakly curved major section to the curvature of the wave front in the more strongly curved major section, such that (for example) sharp near seeing is possible. At the same visual point, the diffractive effect of the other diffraction order (for example the order (0, 1)) has the effect that the curvature in the strongly curved major section is adapted to the curvature in the weakly curved major section, such that sharp seeing is likewise possible at a different object distance (for example for far objects).

The above explanation relates to ophthalmic lenses that, overall, have a spherical effect in the far and near part. A corresponding adaptation of the curvatures may also be made for an ophthalmic lens with astigmatic prescriptions for far and near, wherein the astigmatic prescriptions may differ in axis and/or magnitude of the astigmatism, if applicable.

In the area in which unwanted refractive astigmatism should be compensated for simultaneously for two object distances, the diffractive structure present on or in the ophthalmic lens for compensation of the unwanted astigmatism has a pitch or elevation profile with steps that essentially resemble the shape of (possibly deformed) rhomboids, squares or rectangles. The discontinuities of the pitch thus have the shape of a possibly distorted 2-dimensional grating.

Such a diffractive structure differs significantly from the diffractive elements used in conventional ophthalmic lenses, the pitch of which normally has elongated, stripe-like steps and annular regions between the discontinuities.

In the above examples, the diffractive structure may be arranged such that at least a portion of the diffractive structure significantly covers visual points or regions of the lens in which the refractive focal power has a peripheral, unwanted astigmatism which is greater than a predetermined threshold (for example 0.5 dpt, 0.75 dpt, 1 dpt etc.). As described above, the unwanted astigmatism for at least one wavelength can be reduced by means of the diffractive structure, preferably to a value of at most 2.5 dpt, 2.0 dpt, 1.5 dpt, 1 dpt, 0.5 dpt, 0.3 dpt, 0.25 dpt or 0.2 dpt. In order to avoid additional blurry regions, as described above the diffractive structure may have, toward its edge, continuous transitions of the diffraction efficiency of the diffraction order producing the diffractive, astigmatic focal power.

The diffractive structure may extend across the entire surface of the ophthalmic lens. This has the advantage that the ophthalmic lens may be of thinner construction, due to the additional diffractive focal power portion.

Alternatively, the diffractive structure may extend over only a portion or portions of the lens. The diffractive structure may thus be arranged outside of the areas of the lens that are primarily used for seeing, or outside of the regions of good seeing. What are understood by regions of good seeing are all regions of the lens in which the unwanted astigmatism of the lens or the refractive, astigmatic error is below a predetermined threshold (of 0.5 or 0.75 or 1.0 dpt, for example). Disadvantages of the diffractive structures—for example occurring light scatter or secondary images in the primarily used regions of the ophthalmic lens—may thus be avoided. However, it is possible that at least portions of the regions of good seeing include a diffractive structure, for example if the diffractive structure is designed to correct chromatic aberrations.

If at least one diffractive structure extends only across portions of the ophthalmic lens, a discontinuity of the prism and/or of the focal power may occur at the boundary or at the edge between the purely refractive part and the diffractive structure. In one example, the diffractive structure and/or the refractive part may be designed such that the entire prism of the ophthalmic lens has no discontinuity at least at one part of the boundary between the refractive part and the diffractive structure.

According to a third aspect of the invention, an ophthalmic lens having at least one diffractive structure extending across portions of the lens is provided, wherein the entire prism or the prismatic effect of the lens exhibits no prismatic jumps or no discontinuity, at least at a portion of the boundary between a region of the lens with purely refractive focal power and a region with diffractive and possibly refractive focal power. Such an adaptation of the entire prism of the lens to the boundary between a purely refractive portion and a diffractive portion is preferably made in order to avoid image jumps upon sweeping the gaze between these areas. The adaptation of the entire prism of the lens preferably takes place with the goal of achieving a continuous curve of both the horizontal and the vertical prism along the boundary of the two areas. The adaptation can thereby take place either for a diffraction order or for a prismatic effect that is suitably weighted with the diffraction efficiency and averaged across multiple diffraction orders.

The adaptation of the prismatic effect may take place independently of the curve of the diffraction efficiency and/or the refractive index. An adaptation of the prismatic effect may in particular be advantageous when the diffractive structure has a diffraction efficiency of nearly 100% at least at one part of its edge, and with said edge bounds an area with purely refractive focal power. An adaptation of the prismatic effect may take place at only one part of the edge or of the boundary of the diffractive structure with the refractive part. At another part of the edge of the diffractive structure, an adaptation of the prismatic effect may be deliberately omitted, for example in order to avoid unwanted astigmatic regions.

For example, the adaptation of the prismatic effect may take place in that the prismatic effect of the refractive structure decreases or disappears toward the edge. Another possibility exists in allowing a discontinuity of the prismatic effect due to the refractive structure of the ophthalmic lens. This discontinuity may essentially compensates [sic] for a discontinuity of the prismatic effect that is caused by the diffractive structure at a portion of its edge, such that a continuous curve of the entire prism results. A compensation for the discontinuity of the prismatic effect may take place on the front side and/or back side of the ophthalmic glass. It is likewise possible that the diffractive structure is located in the material of the glass itself.

According to a fourth aspect of the invention, an ophthalmic lens with at least one diffractive structure is proposed, wherein the diffractive structure is designed to reduce the chromatic aberration. In particular, the diffractive structure is designed such that—for at least one area of visual points on the lens—the chromatic aberration of the diffractive structure and the chromatic aberration of the refractive surfaces of the ophthalmic lens at least partially compensate for one another.

Since, via combination of refractive and diffractive structures, a complete compensation of the chromatic aberration can generally not be achieved together with a compensation of astigmatic focal power of the respective structures, both goals are preferably weighed against one another in order to achieve optimal results.

According to a further aspect of the invention, a method is proposed for optimizing ophthalmic lenses having at least one diffractive structure. The method includes specify an ophthalmic lens to be optimized;

optimize the provided lens such that, at least at one evaluation point of the lens, the deviation of the value of at least one optical property of the ophthalmic lens from a nominal value is minimized.

A method to produce ophthalmic lenses having at least one diffractive structure is likewise proposed which includes the method for optimizing ophthalmic lenses according to the above aspect of the invention.

The specification of a lens to be optimized may include the specification of the refractive surfaces of the lens and the diffractive structure and its arrangement on the lens to be optimized. The at least one refractive surface and/or the at least one diffractive structure are preferably described by means of a flexible mathematical representation (for example a spline representation or a polynomial representation).

The optimization method may also include a specification or a diffractive effect of an object distance model and/or a model for the usage position of the lens to be optimized. The object distance model may be a relation, wherein multiple object vergences or multiple object distance surfaces may be associated with one visual point. The lens may be optimized under consideration of the predetermined object distance model in the predetermined usage position of the lens, wherein a sharp imaging at least at one object distance is possible in at least one visual point, preferably at multiple visual points. The usage position of the ophthalmic lens may be characterized by the face form angle and/or the corneal vertex distance and/or the forward tilt and/or the pupillary distance and/or other data.

The method for optimization or production of an ophthalmic lens having at least one diffractive structure may also include detection of data with regard to a spherical and/or astigmatic and/or prismatic effect of the ophthalmic lens that is to be achieved; detection of data with regard to the object distance model; and—in the case of eyeglasses—detection of data with regard to an individual or average usage position of the eyeglasses. The data with regard to the effect to be achieved may be prescription data of an eyeglass wearer or prescription data for the ophthalmic lens to be optimized. The data with regard to an individual or average usage position of the eyeglasses may include the face form angle and/or the corneal vertex distance and/or the forward tilt and/or the pupillary distance and/or other data which characterize the usage position of the eyeglasses.

The optimization may include an alteration of at least one variable parameter of the diffractive structure and/or of at least one variable surface parameter of the refractive surface. In particular, the optimization may include a variation or an adaptation of the diffraction efficiency and/or of the focal power (for example of the spherical, astigmatic and/or prismatic focal power) of at least one, preferably two diffraction orders. The variation or the adaptation of the at least one diffraction order may take place as described above, such that a continuous transition of the focal power between two regions of different focal power takes place; such that the region of good seeing is increased; such that the unwanted astigmatism in at least one region of the lens is minimized; and/or such that the chromatic aberration is minimized. Additionally or alternatively, the optimization may include an adaptation of the entire prism of the lens at the boundary between a purely refractive part and a diffractive part. Such an adaptation is preferably produced such that both the horizontal and the vertical prism have a continuous curve along at least one part of the boundary.

The diffractive structure is preferably described by means of a phase function, for example the phase function $\Psi(x, y)$ introduced in the publication WO 2012/065738. The degree of freedom of the optimization may accordingly be the pitch of at least one of the refractive or diffractive surfaces of the lens and/or the phase function $\Psi(x, y)$, wherein the phase function is evaluated and varied for each of the diffraction orders of the diffractive structure that are to be optimized.

The optimization may take place such that at least one refractive surface of the glass is optimized for a predetermined diffractive structure. The optimization of the diffractive structure is likewise possible given a fixed, predetermined refractive surface. Both the diffractive structure and at least one refractive surface of the glass may also be optimized, wherein the optimization of the surfaces may take place simultaneously or in alternation.

The at least one optical property of the lens that is to be optimized may be the chromatic aberration and/or the at least one monochromatic imaging error, for example the refraction error, the astigmatic deviation and/or the prism of the lens. As described above, the minimization of the deviation of the at least one optical property from a nominal value may take place via a variation of the phase function of the diffractive structure or via a variation of the (local) focal power and/or of the (local) diffraction efficiency of the diffractive structure for at least one, preferably for at least two diffraction orders. The at least one optical effect is preferably evaluated at a plurality of evaluation locations and for at least one diffraction order, and is compared with the corresponding nominal value, wherein the plurality of evaluation locations includes at least 1000, preferably at least 2000, more preferably at least 5000, especially preferably at least 10000 evaluation locations. In principle, there is no limitation to the number of evaluation locations. The number of the evaluation locations may thus be over 20000. The optimization preferably takes place such that the unwanted astigmatism and/or the chromatic aberration is or are minimized.

It may also be advantageous that, in the optimization, the phase function of the diffractive structure should have additional properties (aside from its optical properties) which facilitate the production. For example, this may be achieved in that the phase function of the diffractive structure is suitably mathematically described (for example with the aid of splines) and suitable secondary conditions or nominal values are predetermined in the optimization (for example secondary conditions or nominal values for arbitrary derivatives of the phase function). Another possibility to ensure a simple production capability is to allow suitable analytic functions as a phase function, which suitable analytic functions correspond comparably simply to finished diffractive structures.

The optimization of the ophthalmic lens preferably takes place in a usage position of the lens, wherein the properties of the ophthalmic lens are considered in the usage position and given the presence of the at least one diffractive structure. The calculation of the properties of a lens with at least one diffractive grating in a usage position is described in detail in WO 2012/065738, for example.

The method for optimization preferably takes place iteratively, wherein after every step of the modification of the ophthalmic lens an evaluation of at least one optical property of the modified ophthalmic lens, an assessment of the modified ophthalmic lens depending on the at least one optical property, and possibly an additional modification of the ophthalmic lens take place at least at one evaluation point. The iterative method may be terminated after a defined step. The method is preferably terminated when the assessment of the optical element is positive, i.e. when a specific quality criterion is satisfied.

The optimization or modification of the ophthalmic lens preferably includes a calculation of an objective function which depends on the at least one optical property. If the ophthalmic lens is an eyeglass lens, the objective function may be a monocular or binocular target function.

For example, the optimization of the ophthalmic lens may include a minimization of a polychromatic objective function, for example in order to achieve an optimal correction of the chromatic and astigmatic aberrations of an ophthalmic lens. WO 2012/065737 A1 discloses a suitable polychromatic objective function:

$$F = \sum_{i,\lambda} g_Z(i, \lambda)(Z_\Delta(i, \lambda) - Z_{\Delta, Nominal}(i, \lambda))^2 + g_S(i, \lambda)(S_\Delta(i, \lambda) - S_{\Delta, Nominal}(i, \lambda))^2$$

F is thereby the objective function to be minimized, $S_\Delta$ is the refraction error of the spherical equivalent, $Z_\Delta$ is the magnitude of the astigmatic deviation, $S_{\Delta, Nominal}$ and $Z_{\Delta, Nominal}$ are the corresponding nominal values of the refraction error and of the magnitude of the astigmatic deviation, and $g_S(i, \lambda)$ and $g_Z(i, \lambda)$ are the corresponding weightings of the refraction error and of the magnitude of the astigmatic deviation. All imaging properties are thereby evaluated at a defined wavelength. The sum proceeds across the various evaluation locations i of the eyeglass lens (i.e. across various viewing directions) and across the (at least two) different wavelengths $\lambda$.

According to one aspect of the present invention, multiple diffraction orders with diffraction efficiency >0% may be present at one visual location or at one evaluation location. According to one aspect of the invention, all diffraction orders having a diffraction efficiency different than zero are included given the calculation of the objective function, wherein the local nominal values and weightings are likewise dependent on the diffraction order. The refraction error of the spherical equivalent and the magnitude of the astigmatic deviation for the individual diffraction orders are also calculated. For example, a polychromatic function into which multiple diffraction orders are incorporated is the function:

$$F = \Sigma_{i,\lambda,v} g_Z(i,\lambda,v)(Z_\Delta(i,\lambda,v) - Z_{\Delta,Nominal}(i,\lambda,v))^2 + g_S(i,\lambda,v)(S_\Delta(i,\lambda,v) - S_{\Delta,Nominal}(i,\lambda,v))^2.$$

In the above formula, F is the target function to be minimized, $S_\Delta$ is the refraction error of the spherical equivalent, $Z_\Delta$ is the magnitude of the astigmatic deviation, $S_{\Delta,Nominal}$, $Z_{\Delta,Nominal}$ are the corresponding nominal values of the refraction error and of the magnitude of the astigmatic deviation, and $g_S(i,\lambda,v)$ and $g_Z(i,\lambda,v)$ are the corresponding values. All imaging properties are thereby evaluated given a specific wavelength $\lambda$ and for a specific diffraction order v. The sum proceeds across the various evaluation locations i of the eyeglass lens (i.e. viewing directions), across the various wavelengths and across the different diffraction orders v.

Given identical visual point or evaluation location, as well as identical wavelength, the weightings of various diffraction orders are themselves selected as a monotonically increasing function of the diffraction efficiency.

The method for optimization or production of an ophthalmic lens may also include a provision of processing data of the optimized ophthalmic lens, or possibly of the ophthalmic lens modified in multiple steps. The processing data may include surface data of the refractive surfaces, as well as data of the diffractive grating (for example period, blazing angle, grating lines etc.). The processing data may likewise include data with regard to the thickness of the ophthalmic lens and/or of the diffraction index of the ophthalmic lens.

The method for production of an ophthalmic lens may include a production of the ophthalmic lens according to the provided processing data. Suitable methods for production of lenses with diffractive gratings are known from the prior art.

Furthermore, a device for optimization or production of an ophthalmic lens with at least one diffractive structure is proposed, wherein the device comprises means for specifying an ophthalmic lens to be optimized, and optimization means which are designed to implement an optimization of the optical element according to a preferred exemplary method for optimization of an ophthalmic lens.

In particular, the optimization means are designed to optimize the lens to be optimized so that the deviation of the value of at least one optical property of the ophthalmic lens from a nominal value is minimized at least at one evaluation location. The optimization means may be implemented by means of suitably configured or programmed computers, specialized hardware and/or computer networks or computer systems etc.

The device for production of an optical element may also comprise storage means to store processing data of the optimized ophthalmic lens. The device may also comprise processing means which are designed to produce the optimized ophthalmic lens according to the provided processing data.

Furthermore, the device may comprise detection means which are designed to detect data with regard to an effect of the ophthalmic lens that is to be achieved and/or data with regard to an individual or average usage position of the ophthalmic lens (for example of the eyeglass lens).

Additional objects, features and advantages of the present invention will become clear from the following description of exemplary embodiments with reference to the drawings.

Figure 10:
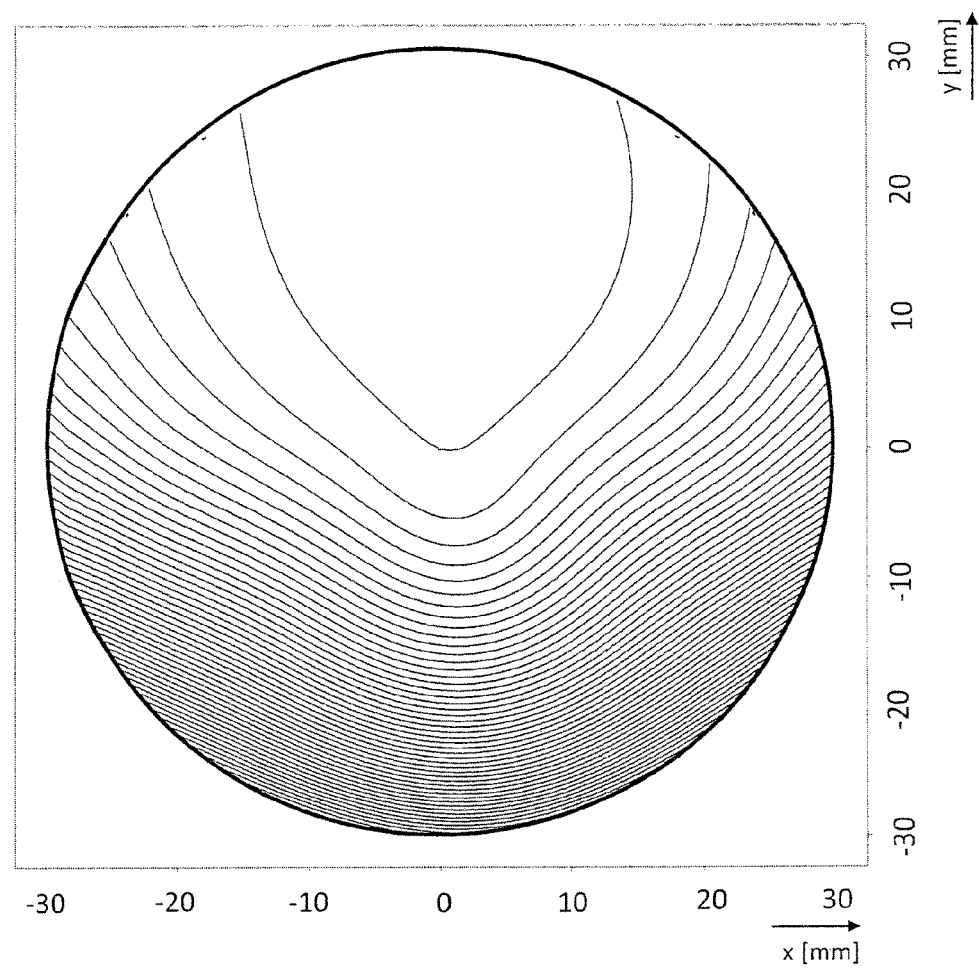
Figure 11:
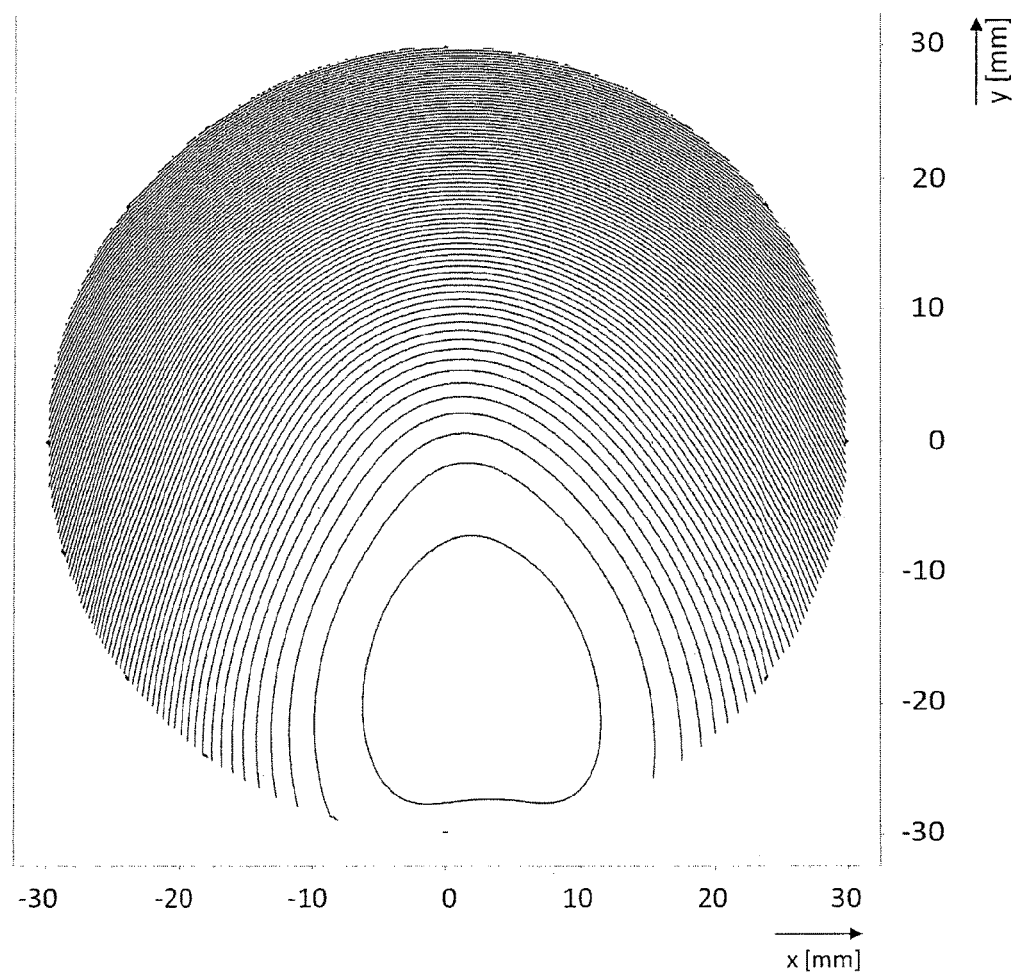
Figure 12:
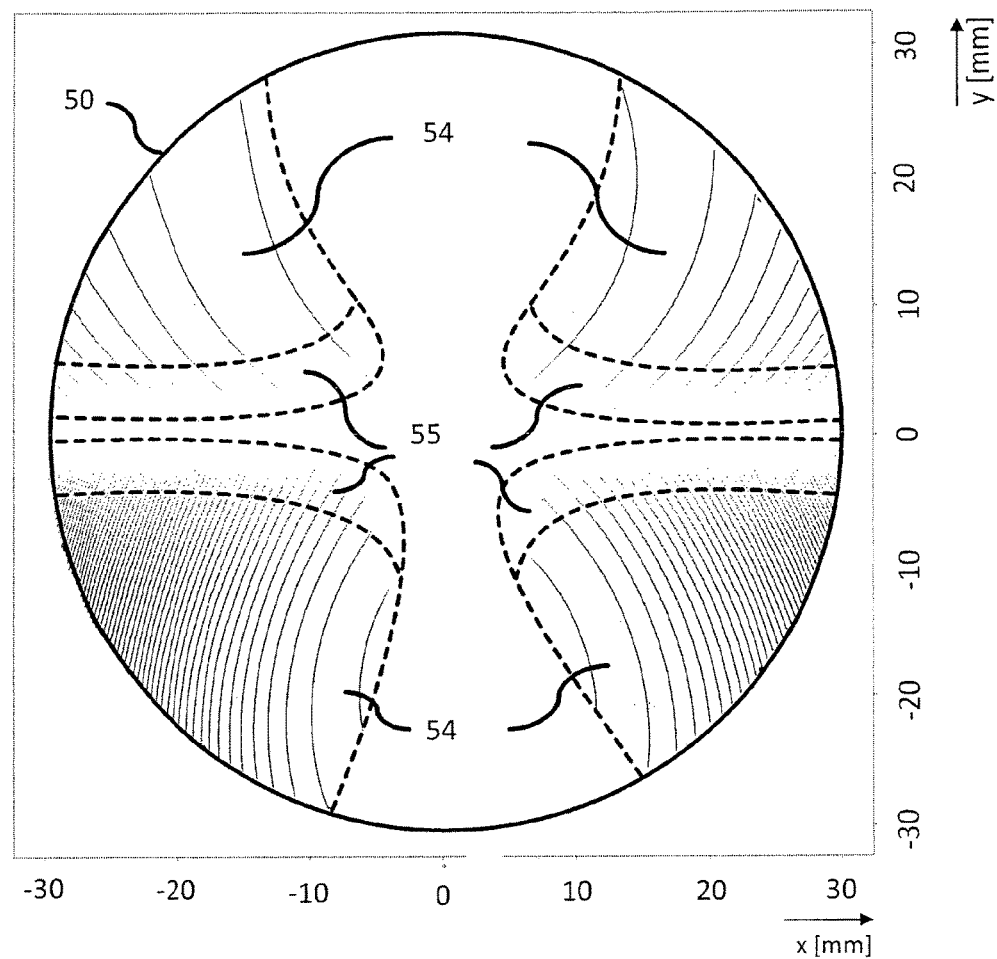
Figure 13:
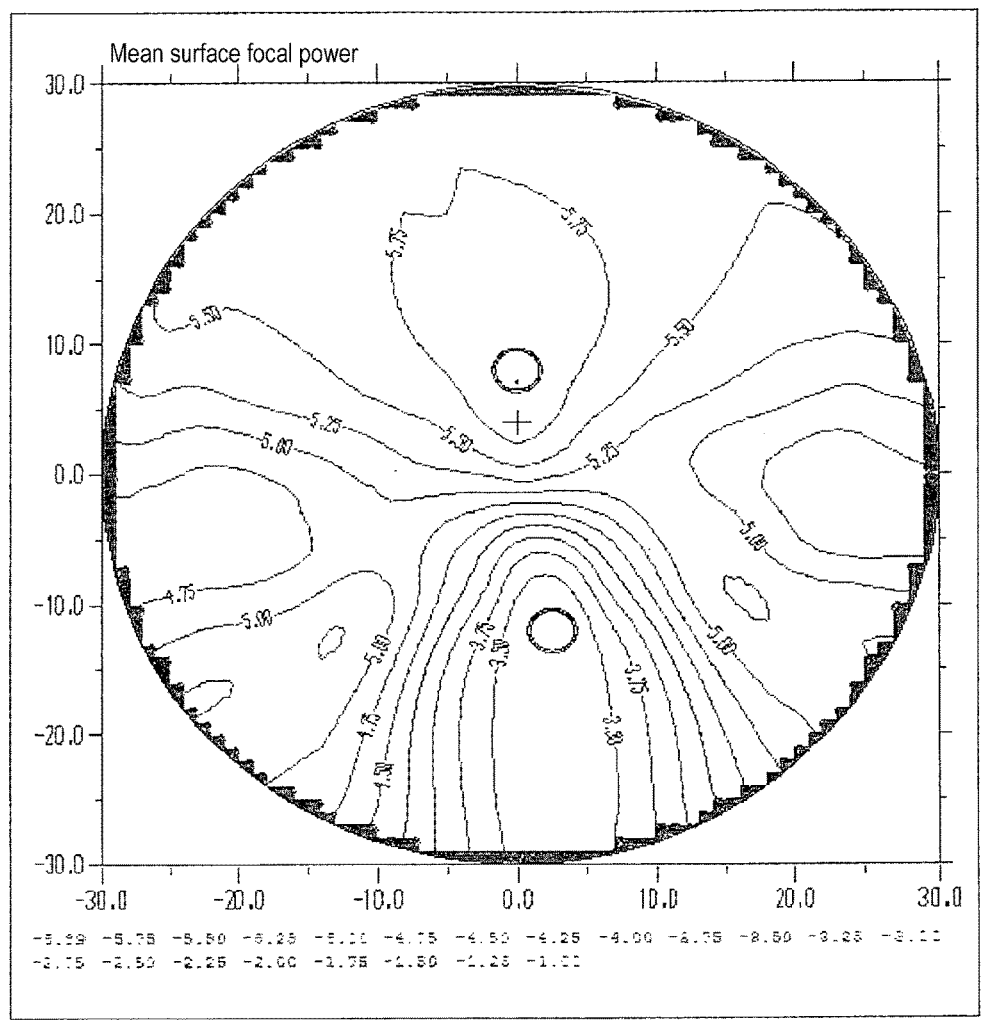
Figure 14:
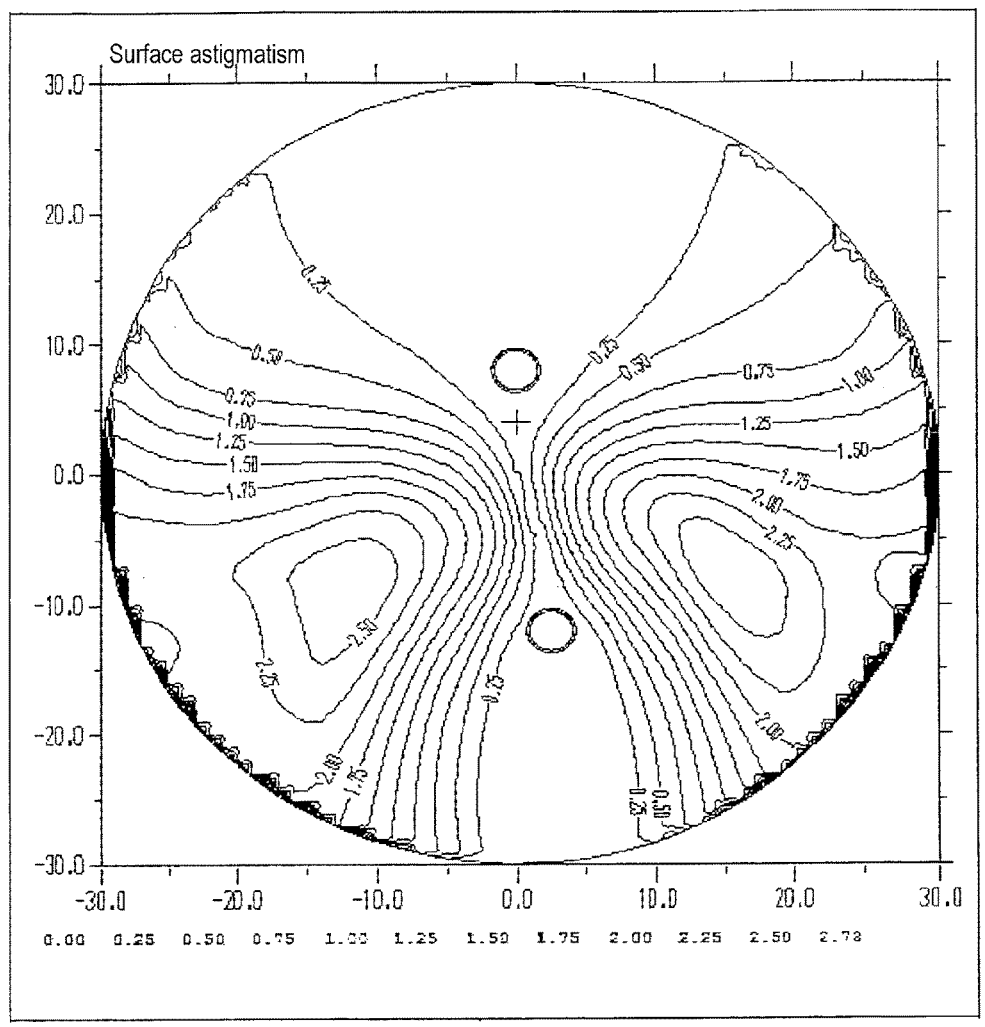

Shown are:

FIG. 1 an arrangement of different regions of an exemplary ophthalmic lens having a diffractive structure;

FIG. 2 an example of a curve of the diffraction efficiency of different diffraction orders in the region of variable diffraction efficiency;

FIG. 3 an example of a beam curve upon seeing through an example of an ophthalmic lens with a diffractive structure;

FIG. 4 examples of ophthalmic lenses with diffractive structures;

FIG. 5 examples of ophthalmic lenses having diffractive structures and reduced peripheral astigmatism;

FIG. 6A, 6B an example of an ophthalmic lens having diffractive structures, in which the diffraction efficiency of three diffraction orders is varied;

FIG. 6C examples of curves of the diffraction efficiency of different diffraction orders of the diffractive structures of the lens shown in FIGS. 6A and 6B;

FIG. 7 examples of ophthalmic lenses having adapted prismatic effect;

FIG. 8 examples of beam curves upon seeing through an ophthalmic lens having diffractive structures and reduced peripheral astigmatism upon gazing through the part of the lens in which the unwanted astigmatism for far seeing has been at least partially compensated for by the diffractive structure;

FIG. 9 examples of beam curves upon seeing through an ophthalmic lens having diffractive structures and reduced peripheral astigmatism upon gazing through the portion of the lens in which the unwanted astigmatism for near seeing has been at least partially compensated for by the diffractive structure;

FIG. 10 an example of a grating that at least partially compensates for the astigmatism upon far seeing;

FIG. 11 an example of a grating that at least partially compensates for the astigmatism upon near seeing;

FIG. 12 an example of a diffractive structure with indicated areas of consistent and changing diffraction efficiency;

FIG. 13 focal power distribution of the purely refractive rear surface of a lens according to the invention;

FIG. 14 astigmatism distribution of the purely refractive rear surface of a lens according to the invention.

In Figures, identical reference characters are used for the same or similar elements. With regard to the specialist terminology that is used, reference is also made in particular to WO 2012/065737 A1 and WO 2012/065738 A1, whose corresponding statements inasmuch represent an integral disclosure component of the present application.

FIG. 1 schematically shows the arrangement of different regions of an example of a lens having a diffractive structure. The lens (for example a bifocal, trifocal or progressive eyeglass lens or a multifocal contact lens) has two regions or areas 10 and 14 of different focal power. The first region 10 has a first reference point 16 (for example a distance reference point) in which the focal power of the lens has a first value (for example the value required by the prescription for far seeing). The second region 14 has a second reference point 18 in which the focal power of the lens has a second value (for example the value required by the prescription) for near seeing). An intermediate region 12 is arranged between the first and second region of the lens.

The line 20 connects the two reference points 16 and 18 or the two regions 10 and 14. The line 20 may be a line which connects the piercing points of the visual lines with the front or rear face of the ophthalmic lens (i.e. the visual points or visual locations) upon lowering gaze from the first reference point to the second. Inasmuch, the line 20 may coincide with the major line of sight [visual axis] of the ophthalmic lens.

The lens also comprises a diffractive structure. In the example shown in FIG. 1, the diffractive structure covers at least part of the first region, of the second region and of the intermediate region 12. However, it is possible that the diffractive structure covers only portions of the region 12, and if applicable portions of the region 14.

In the first region 10, a first, n-th diffraction order of the diffractive structure contributes to the focal power of the lens. The diffraction efficiency eta_n of the n-th diffraction order has a high value in the region 10, for example a value of essentially 100%. In the second region 14, the diffraction order eta_n of the n-th diffraction order has a lower value, for example a value of essentially 0%.

A variation of the diffraction efficiency occurs in the intermediate region 12. In particular, in the intermediate region 12 the diffraction efficiency eta_n of the n-th diffraction order transitions continuously to a low value (for example to a value of essentially 0%) given continuous change of the visual point along the line 20.

A second, m-th diffraction order of the diffractive structure has a curve that is the inverse of the diffraction efficiency: the diffraction efficiency of the m-th diffraction order has a high value in the second region 14 (for example essentially 100%) and a lower value (for example essentially 0%) in the first region 10. The diffraction efficiency of the m-th diffraction order "m" increases to the same degree in which the diffraction efficiency eta_n of the n-th order decreases. The second, m-th order may optionally contribute to the focal power vector. If the m-th order makes no contribution to the focal power vector, a continuous transition of the diffraction efficiency of the n-th order eta_n to 0% and of eta_m to 100% is equivalent to a continuous disappearance of the diffractive structure.

As described above, the n-th diffraction order may be the 1st diffraction order and the m-th diffraction order may be the 0th diffraction order. In this case, the 0th diffraction order makes no contribution to the focal power of the lens. It is also possible that the n-th diffraction order (see line L1 in FIG. 2) and the m-th diffraction order (see line L2 in FIG. 2) are respectively the (1,0) and the (0,1) diffraction order of a two-dimensional grating.

FIG. 2 shows an example of a curve of the diffraction efficiency of the first, n-th diffraction order (line L1) and of the second, m-th diffraction order (line L2) along the line 20.

Due to the variable diffraction efficiency, the diffractive structure offers an additional degree of freedom which may be used to improve ophthalmic lenses. In particular, it is possible to implement a new type of a continuous transition of the focal power from a first reference point that has a first focal power vector (M_1, J0_1, J45_1) to another reference point having a different focal power vector (M_2, J0_2, J45_2). No unwanted blurry regions or distortions arise in this transition.

FIG. 3 shows an example of a beam curve upon seeing through an example of an ophthalmic lens having a diffractive structure. In particular, FIGS. 3A and 3B show an example of an association of multiple object distance areas (here, for example, two object distance areas O1 and O2) with the same visual point in an ophthalmic lens 30 having a diffractive structure. Beam curves are depicted for major sections in which the total focal power for the depicted diffraction orders of the diffractive structure corresponds to the mean spherical equivalent of the total focal power of the respective diffraction orders.

As shown in FIG. 3A, a point P1 on the object distance area O1 is mapped onto a circle of least confusion in the fovea of the eye 32 via diffraction in a first diffraction order (for example n-th diffraction order) (beam path S1). At the same time, a point P2 on a different object distance area O2 is likewise mapped onto a circle of least confusion in the fovea of the eye 32 via diffraction in a different, second diffraction order (for example m-th diffraction order) (beam path S2). The circles of smallest confusion of the mapped points P1 and P2 largely overlap with one another. A sharp imaging of the first point P1 via the first diffraction order and a sharp imaging of the second point P1 via the second diffraction order are thus produced simultaneously.

As FIG. 3B shows, in addition to the imaging of the object point P1 of the object distance area O1 onto a circle of least confusion in the fovea of the eye 32 via the first diffraction order (beam path S1), a blurry and low-contrast imaging of this point onto the retina of the eye 32 simultaneously occurs via the second diffraction order (beam path S3). As shown in FIG. 3C, in addition to the imaging of an object point P2 of the object distance area O2 onto a circle of least confusion in the fovea of the eye 32 via the second diffraction order (beam path S2), a blurry and low-contrast imaging onto the retina of the eye 32 simultaneously occurs via the first diffraction order (beam path S4).

As is clear from FIG. 3, at least one sharp image may be produced at multiple object distances given a fixed visual point or given a fixed visual location. If all diffraction orders having a diffraction efficiency significantly differing from zero are considered jointly, the object distance area is consequently not a function—as given conventional refractive lenses—but rather a relation, since at least one sharp image may be produced at multiple object distances given a fixed visual point.

The image that is perceived by the wearer of such an ophthalmic lens given strong accommodation and that is imaged sharply on the retina, which image is created by the light diffracted in the n-th diffraction order, loses intensity with decreasing diffraction efficiency eta_n. At the same time, the intensity of a blurry image grows, wherein the blurriness is due to aberrations of the second order (defocus and/or astigmatism) and aberrations of a higher order (coma, trefoil, spherical aberration etc.). Therefore, a steady contrast decrease of the sharply reproduced image results as a seeing impression given strong accommodation and a gaze deflection between the first and second reference point, or between the first and second region of differing focal powers. However, the reduction of the contrast is perceived to be significantly less disruptive than (for example) the blurriness caused by unwanted astigmatism, such that the regions in which the ophthalmic delivers an imaging that is perceived to be good by its wearer are relatively large.

Since, given the steady transformation of the diffractive focal power portion between two points or regions of different focal powers, it is not necessary to steadily transform focal power vectors of each region into one another per component, no additional regions of unwanted astigmatism are introduced via the combination of a diffractive structure according to the above example with a refractive structure. A novel transition of the focal power between two regions having different focal power vectors can thereby be realized that may be used in the design of ophthalmic lenses in order to avoid blurry regions, distortions or distinct prismatic jumps.

In the following examples, different applications of the above-described novel transition of the focal power between two regions of different focal power are described. In particular, the proposed transition may be used to completely avoid or (significantly) reduce distinct prismatic jumps and/or unwanted blurry regions and distortions.

Figure 4B:
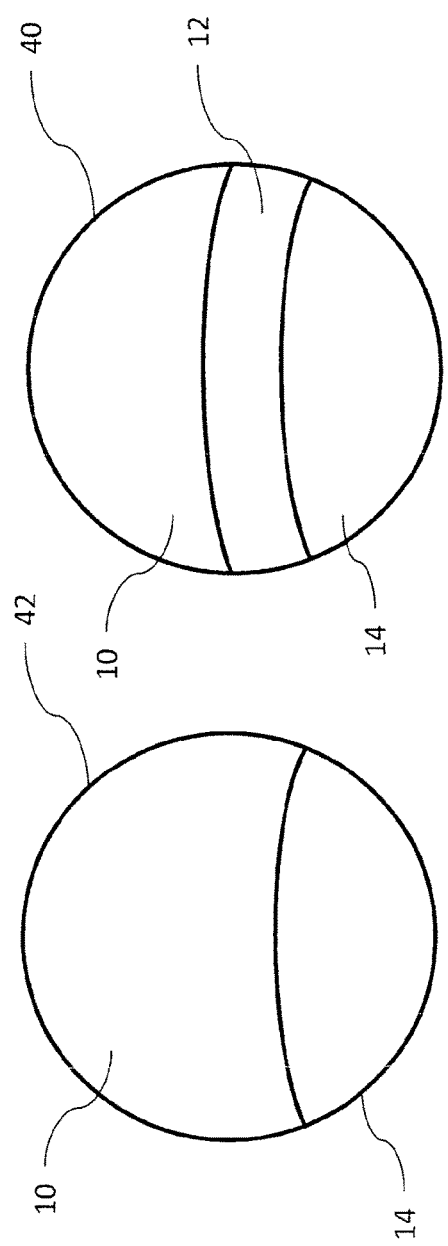

FIG. 4 shows examples of ophthalmic lenses having diffractive structures, wherein FIG. 4A shows an ophthalmic lens in which the diffractive structure is arranged in the upper part of the lens, and FIG. 4B shows an ophthalmic lens in which the diffractive structure is arranged in the lower part of the lens.

Respectively shown on the left in FIGS. 4A and 4B is an ophthalmic lens 42 for presbyopia correction having two regions 10 and 14 of different focal power. The first region has a purely refractive focal power. The second region has both a refractive focal power and a diffractive focal power. Shown to the right in FIGS. 4A and 4B is an ophthalmic lens 40, wherein the two regions 10 and 14 of different focal power adjoin an additional region 12 in which a transition occurs between the focal powers of the two regions 10 and 14.

In the ophthalmic lenses shown in FIGS. 4A and 4B, the diffractive structure has two diffraction orders "n" and "m" with variable diffraction efficiency. The n-th and m-th diffraction orders may respectively be the 1st and 0th diffraction order. The 0th diffraction order thereby has no contribution to the focal power vector of the lens. The 1st diffraction order has a constant focal power contribution independent of the visual location.

The two regions 10 and 12 of different focal power, in which the 1st or the 0th diffraction order respectively essentially have 100% diffraction efficiency, both adjoin the region 14 in which a continuous transition of the diffraction efficiency of the two diffraction orders occurs between essentially 0% and 100%. In the region in which the diffraction efficiency of the 0th order amounts to essentially 100%, the diffractive focal power portion is (0,0,0).

The object distance area in these examples is not a function of the visual point but rather a relation, since objects can be sharply imaged at two distances given one visual point (see FIG. 3).

The region that has a higher focal power overall and is suitable for near seeing is typically located in the lower part of the ophthalmic lens. The region with lower spherical equivalent is located in the upper part of the ophthalmic lens and may be used for far seeing. A different arrangement of the two regions is likewise possible. Independently of the arrangement, the diffractive structure may provide a positive or a negative contribution to the mean spherical equivalent, such that—in different embodiments—the diffractive structure may be located both in the upper part of the ophthalmic lens (see FIG. 4A) and in the lower part of the ophthalmic lens (see FIG. 4B).

In another example, the n-th and m-th diffraction order may respectively be diffraction orders differing from 0. Analogous to the ophthalmic lens shown in FIG. 4, such an ophthalmic lens has two regions with different focal power vectors in which the diffraction efficiency of precisely one order is respectively essentially 100%, and which two regions border a region in which a continuous transition of the diffraction efficiencies of the two diffraction orders takes place. The diffractive structure may in this case extend across the entire surface of the ophthalmic lens. The ophthalmic lens may be made thinner due to the additional diffractive focal power portion of the diffractive structure.

In the above examples, the refractive focal power of the lens may be constant within all three regions. The necessary increase of the focal power of the lens may take place solely due to the diffractive structure.

However, in an ophthalmic lens it is likewise possible to realize a continuous refractive focal power curve, and thus to enable a sharp imaging in a continuous range of object distances. Due to the diffractive structure, the strength of the unwanted blurry regions occurring in the periphery may simultaneously be reduced. The refractive focal power portion of the region of the ophthalmic lens that is designed for near seeing may be designed to be lower than given a purely refractive lens. The missing spherical effect is generated by a diffractive structure which is located in the region designed for near seeing. The diffraction efficiency of the order generating the additional effect may decrease toward the edge of the diffractive structure to a small value, preferably to a value of 0%, such that no additional astigmatism occurs in the periphery of the lens. Since the diffraction of the spherical portion of the refractive focal power between the two reference points is smaller than given a conventional, purely refractive lens, the strength of the peripheral unwanted astigmatism is likewise smaller than given a purely refractive lens having the same focal power.

Beyond the avoidance of blurring and prismatic jumps, the transition depicted above between regions of different focal power may likewise be used in order to at least partially compensate for the unwanted astigmatism that is already present. Such an embodiment is advantageous in particular in the case of a continuous refractive focal power curve. Peripheral astigmatism inevitably arises due to the continuous curve of the refractive focal power, which peripheral astigmatism may be reduced or at least partially compensated for by means of diffractive structures. At the same time, disadvantages of the diffractive structures—for example the occurrence of light scatter or secondary images in the primarily used regions of the ophthalmic lens—may be avoided.

In order to at least partially compensate for the unwanted astigmatism, at least a portion of the diffractive structure is placed on the ophthalmic lens so that it essentially covers visual locations at which the refractive focal power exhibits a relatively high peripheral astigmatism. At the same time, the position of the diffractive structure is preferably selected such that it does not extend into the areas of the lens that are predominantly used for seeing, and also does not lead to unwanted degradation of the visual impression due to secondary images or light scatter. For example, the diffractive structure may be arranged in the regions of the ophthalmic lens (for example a progressive lens) in which the unwanted astigmatism is greater than 0.5; 0.75; 1.0 dpt, or as a different predetermined threshold.

The diffractive structure has an astigmatic focal power portion which at least partially compensates for the unwanted astigmatism of the refractive structure. The diffractive and refractive focal power portions together yield a combined focal power whose unwanted astigmatism is less than is the case given a purely refractive ophthalmic lens. The phase function of such a diffractive structure is a phase function that is rotationally asymmetrical.

The periodicity of the diffractive structure may be selected such that it has a constant or inconstant diffractive focal power. Diffractive structures having constant focal power are normally easier to produce but offer fewer degrees of freedom in the correction of the unwanted astigmatism. Diffractive structures having an inconstant focal power enable a better compensation of the astigmatism of the refractive structure since—depending on the visual location—a different diffractive effect may be necessary for complete or at least partial compensation of the refractive astigmatism. Axis position and/or magnitude of the astigmatism of the diffractive focal power portion may thereby be varied.

In order to avoid additional blurry regions, towards its edge the diffractive structure may have continuous transitions of the diffraction efficiency of the diffraction order generating the diffractive astigmatic focal power, for example as described above.

According to one example, a compensation of the astigmatism may take place with two diffraction orders situated orthogonal to one another and differing from the 0th diffraction order. Since the major sections of strongest or weakest curvature of the wave front passing through the ophthalmic lens which were generated by the purely refractive effect are essentially orthogonal to one another, it allows a compensation with two diffraction orders orthogonal to one another to compensate—at the same visual location—for the astigmatism for two different object distances (for example for far seeing and near seeing).

The astigmatism for an object distance (for example for near seeing) may thus take place entirely or partially by means of the diffractive focal power generated by one or both diffraction orders. This diffraction order (for example the order (1,0)) may generate a diffractive effect or focal power which conforms the curvature of the wave front in the weakly curved major section to the curvature of the wave front in the strongly curved major section so that sharp seeing at this object distance is possible, for example. At the same visual point, the diffractive effect of the other diffraction order (for example the order (0,1)) causes the curvature in the strongly curved major section to be conformed to the curvature in the weakly curved major section, such that sharp seeing at a different object distance is likewise possible, for example for far objects (as shown in FIGS. 3 and 8).

The correction described above, of the major sections of the wave front passing through the ophthalmic lens, refers to ophthalmic lenses that overall have a spherical effect in the two regions of different focal power (for example in the far and near part). Similarly, a corresponding adaptation of the curvatures may be produced for an ophthalmic lens having astigmatic prescriptions for far and near, wherein the astigmatic prescriptions may differ in axis and/or magnitude of the astigmatism, if applicable.

In the region in which unwanted refractive astigmatism is compensated simultaneously for two object distances, the diffractive structure present on or in an ophthalmic lens according to the invention exhibits a phase function which differs significantly from the phase functions of conventional diffractive elements used in lenses. In particular, the phase function has levels that are essentially similar to the shape of rhomboids, squares or rectangles and that are possibly deformed. The discontinuities of the phase function thus have the shape of a (possibly distorted) 2-dimensional grating. Such a diffractive structure differs significantly from the diffractive elements conventionally used in ophthalmic lenses, whose phase function normally exhibits elongated, band-like stages and has annular regions between the discontinuities.

FIG. 5 shows examples of ophthalmic lenses (for example progressive eyeglass lenses) having diffractive structures that are designed for compensation of the unwanted astigmatism of the lenses, wherein FIG. 5A shows a lens designed for far seeing, FIG. 5B shows a lens designed for near seeing, and FIG. 5C shows an ophthalmic lens designed for seeing at middle distances. The left column in FIG. 5 respectively shows an example of an arrangement of the regions of the refractive focal power of the ophthalmic lens; the middle column shows an example of an arrangement of the diffractive structures, and the right column shows the depiction of the areas of the ophthalmic lens in which sharp seeing is possible in at least one of the diffraction orders and at least at one object distance.

The ophthalmic lens 50 shown in FIG. 5A is a lens which is designed for far seeing. The far part of the lens that is provided for this has a particularly large region 51 that is essentially free of astigmatism. In this essentially astigmatism-free region 51, a sharp seeing of far objects is possible solely with the aid of the refractive focal power of the ophthalmic lens. The region 51 is preferably free of diffractive structures. In the regions 52 to the left and right of the region 51, blurring occurs due to unwanted peripheral astigmatism. The unwanted occurring peripheral astigmatism is represented by the isoastigmatism lines 53 as an example. For example, the 0.5 dpt (or 0.75 dpt or 1.0 dpt) isoastigmatism line may separate the region of good seeing 51 from the regions with unwanted peripheral astigmatism 52.

An example of an arrangement of two diffractive structures on or in the ophthalmic lens 50 is depicted in the middle of FIG. 5A. In this example, the two diffractive structures are respectively located in the regions 54 and 55, primarily in the lower region of the lens that is designed primarily for near seeing. The diffraction efficiency in the regions 54 is approximately constant; a curve of the diffraction efficiency of two diffraction orders between points having different focal power occurs only in the regions 55. The diffractive structures are—as described above—designed to at least partially compensate for the unwanted peripheral astigmatism of the refractive focal power portion. Sharp seeing of near objects given reduced contrast is possible at the visual points at which the peripheral astigmatism has been compensated for near seeing; far objects appear blurry (see for example FIG. 8).

The regions in the ophthalmic lens 50 in which sharp seeing is possible in at least one of the diffraction orders and at least at one object distance are shown schematically in the right illustration in FIG. 5A. A largely astigmatism-free far seeing (region 56), near seeing (region 58) and seeing at middle distances (region 57) are respectively possible in regions 56, 57 and 58. The regions 59 represent regions with insufficiently sharp imaging in which the peripheral astigmatism is greater than a predetermined threshold.

Given an ophthalmic lens designed primarily for near seeing, the refractive focal power curve may conversely be chosen so that the near part provided for near seeing has a particularly large, essentially astigmatism-free region 51

(see FIG. 5B, left). Due to two diffractive structures that are arranged in the far portion of the lens (see FIG. 5B, middle), the unwanted astigmatism of the refractive focal power portion that is present there is at least partially compensated for. As shown in the right illustration in FIG. 5B, sharp seeing of far objects given reduced contrast is possible at the visual points at which the peripheral astigmatism has been compensated for far seeing; far objects [sic] appear blurry (see for example FIG. 9).

Given an ophthalmic lens that should have a particularly large region with which objects at middle distances should be viewed, a refractive focal power curve may accordingly be selected that has a particularly wide region for seeing at middle distances (see FIG. 5C, left). Although the unwanted astigmatism accordingly increases in both the region designed for far seeing and in the region designed for near seeing, these may be at least partially compensated for with four diffractive structures that are arranged in the middle part of the lens (see FIG. 5C, middle). In such an ophthalmic lens there are visual points in which sharp seeing is possible far or near with contrast loss (see FIGS. 8 and 9). Both the near region and the far region may thus be enlarged (see the right illustration in FIG. 5C).

In a further adaptation of the ophthalmic lens shown in FIG. 5C, a transition between the focal power in the far part and in the near part of a lens is generated with the aid of a respective diffractive structure to the left and right of the part of the ophthalmic lens that is provided for seeing at middle distances. For this, the diffraction efficiency of three diffraction orders is varied in the areas in which a transition occurs. FIGS. 6A and 6B show an example of an ophthalmic lens 60 having diffractive structures given which the diffraction efficiency of three diffraction orders is varied.

In the areas 62 and 64, the unwanted refractive astigmatism that is caused by the refractive focal power curve is at least partially compensated for. The diffraction efficiency in the area 62 is thereby approximately constant, and the curve between points having different focal power occurs in the area 64 with the aid of three diffraction orders. This transition is designed such that the diffraction efficiency of a respective one of the diffraction orders is essentially 100% at least in a region of the lines 66, 67 and 68. At points at which two of the lines 66, 67 and 68 adjoin one another, the diffraction efficiency of one of the respective corresponding diffraction orders is essentially 0%.

For example, a diffraction order (for example an n-th diffraction order) compensating for the astigmatism in the far part may have a diffraction efficiency of essentially 100% in the far part of the ophthalmic lens and decline to essentially 0% given gaze deflection towards both the near part and towards the intervening region. Conversely, the same applies to the diffraction order (for example the m-th diffraction order) compensating for the astigmatism in the near part, the diffraction efficiency of which declines from essentially 100% to essentially 0% give gaze deflection towards the far part or towards the intervening region. The third diffraction order (for example the k-th diffraction order, which may be the 0th diffraction order) has a diffraction efficiency of essentially 100% at the boundary between the diffractive structure and the intervening region, which diffraction efficiency drops to essentially 0% in the direction of the periphery of the lens. The two diffraction orders compensating for the astigmatism in the near part or far part may thereby be identical (for example the 1st diffraction order), but also may be different (for example the orders (1,0) and (0,1) of a diffractive structure which generates diffraction maximums in two directions orthogonal to one another).

FIG. 6B shows visual points X1, X2, X3, X4, X12a, X12b, X12c, X23a, X23b, X23c on the ophthalmic lens in the different areas. In particular:
  X12a and X23b designate points in which the prismatic effect is adapted between an area of purely refractive focal power and an area of refractive and diffractive focal power, and
  X12b, X23a and X24 designate points in which a continuous transition (described above) occurs between areas with purely refractive focal power and areas with refractive and service focal power.

FIG. 6C shows examples of curves of the diffraction efficiency of the different diffraction orders as a function of the position along the respective connecting lines, wherein the dashed line X00 designates the 0th diffraction order, the solid line X01 represents the (1,0) diffraction order and the dotted line X02 designates the (0,1) diffraction order.

In an additional example of an ophthalmic lens, an adaptation of the prismatic effect of the ophthalmic lens may be made at the boundary between an area having purely refractive focal power and an area having diffractive and possibly refractive focal power. The adaptation may take place with the goal of achieving a continuous curve of both the horizontal and the vertical prism (i.e. of both components of the entire prism) along the boundary of the different areas. Image discontinuities may thereby be avoided or reduced upon sweeping the gaze between the areas of purely refractive focal power and areas having diffractive and possibly refractive [sic]. The adaptation of the prismatic effect, or of the entire prism of the lens, may take place for a diffraction order. Alternatives [sic], the adaptation may take place for a prismatic effect that is suitably weighted with the diffraction efficiency and averaged across multiple diffraction orders.

The adaptation of the prismatic effect may thereby take place independently of the curve of the diffraction efficiency. An adaptation of the prismatic effect is particularly advantageous if the diffractive structure has a diffraction efficiency near 100% at least at a portion of its edge, and with this edge adjoins an area having purely refractive focal power. An adaptation of the prismatic effect may take place along the entire edge of the diffractive structure. However, it is possible to produce the adaptation of the prismatic effect at only a portion of the edge of the diffractive structure. An adaptation of the prismatic effect may be intentionally abandoned at a different portion of the edge of the diffractive structure in order to avoid unwanted astigmatic regions.

The adaptation of the prismatic effect may take place in that, for example, the prismatic effect of the refractive structure decreases or disappears towards the edge. Another possibility is to allow a discontinuity of the prismatic effect due to the refractive structure of the ophthalmic lens. This discontinuity may essentially compensate for a discontinuity of the prismatic effect that is caused by the diffractive structure at a portion of its edge, such that a continuous curve of the entire prism results. A discontinuity of the prismatic effect due to the refractive structure or due to the refractive portion of the lens may take place on the front and/or back side of the ophthalmic lens.

Given all of the examples of ophthalmic lenses that are described above, an adaptation may additionally take place of the prismatic effect of the lens at the boundary between a respective one of the areas having refractive and diffractive focal power and the adjoining areas having purely refractive focal power and low astigmatism. At the same time, the diffraction efficiency of the diffraction order compensating for the astigmatism is essentially 100% at the boundary between both areas. An adaptation of the prismatic effect is not sought at the remaining edges of the area having refractive and diffractive focal power; instead of this, the diffraction efficiency of the diffraction order compensating for the astigmatism decreases to essentially 0%.

FIG. 7 shows an example of an arrangement of the diffractive structures in three different ophthalmic lenses 70 having adapted prismatic effect. FIG. 7A thereby shows an ophthalmic lens having a wide far part which is similar to the lens shown in FIG. 5A; FIG. 7B shows an ophthalmic lens having a wide near part which is similar to the lens shown in FIG. 5B; FIG. 7C shows an ophthalmic lens having a wide middle part which is similar to the lens shown in FIG. 5C; and FIG. 7D shows an ophthalmic lens which is similar to the lens shown in FIG. 6.

In the regions 72 and 74 or 84 of the ophthalmic lens, the unwanted refractive astigmatism that is caused by the refractive focal power curve is at least partially compensated for as described above by means of suitably designed diffractive structures. The diffraction efficiency in the region 72 is thereby approximately constant. The curve of the diffraction efficiency between points having different focal power occurs in the region 74 or 84. A transition with the aid of two diffraction orders occurs in the area 74, as explained above. In the area 84, three diffraction orders are used for the transition, wherein the diffraction efficiency of a respective different diffraction order is nearly 100% in at least one region of the lines 86, 87 and 88. At points at which two of the lines 86, 87 and 88 adjoin one another, the diffraction efficiency of a respective one of the corresponding diffraction orders is essentially 0%. The diffractive structures additionally possess an edge or edges 76 or 89 at which a compensation of the prismatic effects occurs (as described above).

It is likewise possible to implement an adaptation of the prismatic effect even given ophthalmic lenses without correction of the peripheral astigmatism (such as the lenses shown in FIG. 4, for example). Given these lenses, the region having both refractive and diffractive focal power may be located between two regions having purely refractive focal power which are designed for seeing far or near. Between one of these refractive regions and the hybrid region, the prismatic effect is adapted such that image jumps are avoided. The continuous decline of the diffraction efficiency of at least one diffraction order occurs between the other purely refractive region and the hybrid region. Overall, a larger area without disturbing secondary images or light scatter is thus provided to the wearer of such an ophthalmic lens.

FIG. 8 schematically shows the beam curves for two diffraction orders for major sections of least and greatest focal power given a view through an area of an ophthalmic lens 90 in which the unwanted refractive astigmatism was compensated for given far seeing. FIG. 8A shows the beam curves upon far viewing and FIG. 8B shows the beam curves upon viewing near.

As shown in FIG. 8A, upon viewing a far object at or on the object distance surface O1, a sharp image is created in the eye 32 due to the beam curve S1 of a first diffraction order. At the same time, a blurry and astigmatic image is likewise created by the beam curves S3 and S5 of a second diffraction order. Upon viewing a near object at or on the object distance surface O2, a blurry astigmatism image is created in the eye 82 due to the beam curve S2, S6 of a first diffraction order. At the same time, a second image is likewise created that is likewise blurry due to the beam curve S4 of a second diffraction order (see FIG. 8B).

FIG. 9 shows a schematic depiction of the beam curves for two diffraction orders for major sections of least and greatest focal power upon viewing through an area of an ophthalmic lens 90 in which the unwanted refractive astigmatism has been compensated for upon near viewing. FIG. 9A shows the beam curves upon far viewing and FIG. 9B shows the beam curves upon near viewing.

As shown in FIG. 9A, upon viewing a far object at the object distance surface O1 a blurry, astigmatic image is created in the eye 32 due to the beam curve S1, S5 of a first diffraction order. At the same time, a second image is likewise created that is likewise blurry due to the beam curve S3 of a second diffraction order. Upon viewing a near object in the object distance area O2, a sharp image is created in the eye 32 due to the beam curve S2 of a first diffraction order. At the same time, a blurry and astigmatic image is likewise created by the beam curves S4, S6 of a second diffraction order (see FIG. 9B).

FIG. 10 through 14 show examples of progressive eyeglass lenses having different diffractive gratings. All eyeglass lenses are designed for the refraction Sph=0.5 dpt; Cyl=O dpt and Add=2.5 dpt and have a spherical front surface having a refractive mean surface focal power of 6.25 dpt and the identical, purely refractive progressive rear surface.

FIG. 10 shows an example of a grating that at least partially compensates for the astigmatism upon far viewing, wherein the curve of every 100th grating band is shown. The grating is arranged on the spherical front surface of the eyeglass lens. The diffraction efficiency in this case is 1 or 100%.

FIG. 11 shows an example of a grating that at least partially compensates for the astigmatism upon near viewing, wherein the curve of every 100th grating band is shown. The grating is arranged on the spherical front surface of the eyeglass lens. The diffraction efficiency in this case is 1, or 100%.

FIG. 12 shows an example of a diffractive structure that at least partially compensates for the peripheral unwanted astigmatism in the far and near range, wherein the curve of every 100th grating band is shown. The diffractive structure is arranged on the spherical front surface of the eyeglass lens and has at least one diffraction order having variable diffraction efficiency, wherein the variations in the diffraction efficiency are represented by the variations of the contrast of the depicted grating bands. In FIG. 12, the diffractive structure is depicted with drawn areas of uniform and changing diffraction efficiency of the diffractive structure.

The diffractive structure comprises four areas, or four individual diffractive gratings, that are respectively arranged to the left and right of the major viewing line in the upper and lower part of the lens. Every diffractive grating has an area of uniform diffraction efficiency 54 and an area of changing diffraction efficiency 55. The arrangement of the areas of uniform diffraction efficiency 54 and of changing diffraction efficiency 55 corresponds to the arrangement shown in the middle of FIG. 5C, for example. If only the upper part (y>0 mm) or lower part (y<0 mm) of the diffractive structure depicted in FIG. 12 should respectively be used, diffractive structures may be realized that may at least partially compensate for the unwanted peripheral astigmatism in the far or near range (see for example FIG. 5B, middle, or 5A, middle).

FIG. 13 shows the curve of the mean surface focal power of the purely refractive rear surface of the eyeglass lens. FIG. 14 shows the curve of the surface astigmatism of the refractive rear surface of the eyeglass lens. The distance between two adjacent isofocal power lines or isoastigmatism lines is 0.25 dpt.

An additional preferred embodiment of the invention concerns an ophthalmic lens having continuous focal power transition between two points, which ophthalmic lens has at least one diffractive structure, characterized in that:

the peripherally occurring, unwanted astigmatisms of the refractive focal power portion are at least partially compensated for with the aid of the diffractive focal power portion (for example below 2.5, 2.0, 1.5, 0.5, 0.3, 0.25 or 0.2 dpt in at least one diffraction order);

there is at least one connecting line between a far and a near reference point of the lens, along which connecting line the diffraction efficiency of at least one diffraction order changes continuously; and there is at least one connecting line between far and a near reference point along which the refractive portion of the focal power changes continuously.

In addition or as an alternative to the ophthalmic lenses having diffractive structures that are described above, it is possible to reduce the chromatic aberration of an ophthalmic lens via a suitable combination of refractive and diffractive structures. In one example, the diffractive structure is designed such that the chromatic aberration of the diffractive structure and the chromatic aberration of the refractive surfaces of the ophthalmic lens at least partially compensate for one another for at least one area of visual points.

Since a complete compensation of the chromatic aberration simultaneously with a compensation of astigmatic focal power of the respective structures generally cannot be achieved via combination of refractive and diffractive structures, both goals may be weighed against one another. Given an optimization of an ophthalmic lens having refractive and diffractive structures, this may take place via a target function, for example as known from WO 2012/065737:

$$F = \sum_{i,\lambda} g_Z(i,\lambda)(Z_\Delta(i,\lambda) - Z_{\Delta,Nominal}(i,\lambda))^2 +$$
$$g_S(i,\lambda)(S_\Delta(i,\lambda) - S_{\Delta,Nominal}(i,\lambda))^2$$

In this formula, F is the target function to be minimized, $S_\Delta$ and $Z_\Delta$ are the refraction errors of the spherical equivalent or the magnitude of the astigmatic deviation, $S_{\Delta,Nominal}$ and $Z_{\Delta,Nominal}$ are the corresponding nominal values, and $g_Z(i,\lambda)$, $g_Z(i,\lambda)$ [sic] are the corresponding weightings. All imaging properties are evaluated at a defined wavelength, and the sum over the index i runs across various evaluation locations or viewing directions of the ophthalmic lens (for example an eyeglass lens), as well as across the wavelength $\lambda$, wherein the target function includes at least two different values for the wavelength.

Except for a pitch of the refracting surfaces, degree of freedom of the optimization is likewise a function that describes the diffractive structure, for example the phase function $\Psi(x,y)$ introduced in WO 2012/065738 A1.

Since there can be multiple diffraction orders v having a diffraction efficiency differing from zero at a visual point, in an example of an optimization method all of these diffraction orders are incorporated into the calculation of the target function. It is also suitable to provide nominal values and weightings depending on the diffraction order. All optical properties of the lens (for example the refraction error of the spherical equivalent and the magnitude of the astigmatic deviation) that are to be evaluated are calculated for the respective diffraction order.

A polychromatic function that is expanded with regard to the diffraction orders may, for example, be the function:

$$F = \sum_{i,\lambda,v} g_Z(i,\lambda,v)(Z_\Delta(i,\lambda,v) - Z_{\Delta,Nominal}(i,\lambda,v))^2 +$$
$$g_S(i,\lambda,v)(S_\Delta(i,\lambda,v) - S_{\Delta,Nominal}(i,\lambda,v))^2.$$

In the above formula, the summation takes place not only over all evaluation locations i and wavelengths $\lambda$ but rather also over all diffraction orders v.

The weightings of different diffraction orders given an identical visual location or evaluation location, as well as identical wavelength, may themselves be selected as a monotonically increasing function of the diffraction efficiency.

The above polychromatic function may be expanded with additional optical properties or with additional imaging errors, for example the local prismatic effect of the lens. Instead of the refraction error and the astigmatic deviation, other imaging errors may likewise be incorporated into the target function. The polychromatic function may depend only on a weighted term, for example on the weighted refraction error or on the weighted astigmatic deviation.

If the ophthalmic lens having at least one diffractive structure is calculated or optimized, the corresponding surface data and data of the diffractive structure are provided and an ophthalmic lens is finished. The production methods and processing machines that are required for this are known from the prior art.

REFERENCE LIST 10, 14 regions of different focal power
12 region of variable diffraction efficiency
16, 18 reference points
20 line which connects the reference points
30, 40, 42, 50, 60, 70, 80, 90: ophthalmic lenses
32 fovea of the eye
51 astigmatism-free region
52 region of the peripheral, unwanted astigmatism
53 isoastigmatism lines
54, 55 regions having diffractive structures
54 region of approximately constant diffraction efficiency
55 region of variable diffraction efficiency
56, 57, 58 regions that are respectively designed for seeing far, near and at middle distances
59 regions having insufficiently sharp imaging
62, 64 regions in which the unwanted refractive astigmatism that is caused by the refractive focal power curve is at least partially compensated for
62 region of approximately constant diffraction efficiency
64 region of variable diffraction efficiency
66, 67, 68 lines of maximum diffraction efficiency of a diffraction order
72, 74 regions having diffractive structures
72 region of approximately constant diffraction efficiency
74 region of variable diffraction efficiency
82, 84 regions in which the unwanted refractive astigmatism that is caused by the refractive focal power curve is at least partially compensated for
82 region of approximately constant diffraction efficiency
84 region of variable diffraction efficiency
86, 87, 88 lines of maximum diffraction efficiency of a diffraction order 76, 89 edges between the diffractive structure and the refractive part at which a compensation of the prismatic effects occurs
L1, L2, X00, X01, X02 curve of the diffraction efficiency for two different diffraction orders
O1, O2 object distance surfaces
S1 to S8 beam paths through the ophthalmic lens
X1, X2, X3, X4, X12a, X12b, X12c, X23a, X23b, X23c visual points

The invention claimed is:

1. An ophthalmic lens for presbyopia correction, comprising:
   at least one diffractive structure, wherein the diffractive structure has at least one region of variable diffraction efficiency in which the diffraction efficiency of at least one diffraction order of the diffractive structure that contributes to the focal power of the lens varies depending on the visual point on the ophthalmic lens,
   wherein the diffractive structure has an astigmatic diffractive power that at least partially compensates for the unwanted astigmatism of the refractive part of the ophthalmic lens, and is designed to generate at least two diffraction orders situated orthogonal to one another, and wherein the diffractive structure is also designed to entirely or at least partially compensate for the unwanted astigmatism of the refractive part of the ophthalmic lens for a first object distance at a visual point by the astigmatic effect generated by the first diffraction order; and to entirely or at least partially compensate for the unwanted astigmatism of the refractive part of the ophthalmic lens for a second object distance at the same visual point by the astigmatic effect generated by the second diffraction order.

2. The ophthalmic lens according to claim 1, wherein the variation of the diffraction efficiency is constant.

3. The ophthalmic lens according to claim 2, wherein the diffraction efficiency of the at least one diffraction order of the diffractive structure changes invariably along a line which connects a first reference point of the lens with a second reference point of the lens.

4. The ophthalmic lens according to claim 1, wherein the diffraction efficiency of at least one additional diffraction order varies spatially in a region of variable diffraction efficiency, depending on the visual point on the ophthalmic lens.

5. The ophthalmic according to claim 4, wherein
   the diffraction efficiency of a first diffraction order decreases constantly along the line connecting the reference points; and
   the diffraction efficiency of the at least one additional diffraction order increases along the line connecting the reference points.

6. The ophthalmic lens according to claim 5, wherein the diffraction efficiency of the first diffraction order amounts to a value of essentially 100% at a first reference point and a value of essentially 0% at a second reference point.

7. The ophthalmic lens according to claim 1, wherein the diffractive structure also has
   at least one region of variable diffractive focal power in which the focal power of at least one diffraction order of the diffractive structure is variable; or
   at least one region of constant diffraction efficiency in which the focal power of the at least one diffraction order of the diffractive structure is constant.

8. The ophthalmic lens according to claim 1, wherein the diffractive structure is arranged in the regions of the ophthalmic lens where the unwanted astigmatism of the refractive part of the ophthalmic lens is greater than 0.5 dpt.

9. The ophthalmic lens according to claim 1, wherein the at least one diffractive structure borders at least one refractive part, and wherein the diffractive structure and the refractive part are designed such that the entire prism of the lens has no discontinuity at least at a portion of the boundary between the refractive part and the diffractive structure.

10. The ophthalmic lens according to claim 1, wherein the diffractive structure is designed to at least partially compensate for the chromatic aberrations of the refractive part of the ophthalmic lens, in at least one region of the lens.

11. A method to produce an ophthalmic lens for presbyopia correction, comprising:
    providing an ophthalmic lens to be optimized, said lens comprising:
       at least one diffractive structure, wherein the diffractive structure has at least one region of variable diffraction efficiency in which the diffraction efficiency of at least one diffraction order of the diffractive structure that contributes to the focal power of the lens varies depending on the visual point on the ophthalmic lens,
       wherein the diffractive structure has an astigmatic diffractive power that at least partially compensates for the unwanted astigmatism of the refractive part of the ophthalmic lens, and is designed to generate at least two diffraction orders situated orthogonal to one another, and wherein the diffractive structure is also designed to entirely or at least partially compensate for the unwanted astigmatism of the refractive part of the ophthalmic lens for a first object distance at a visual point by the astigmatic effect generated by the first diffraction order; and to entirely or at least partially compensate for the unwanted astigmatism of the refractive part of the ophthalmic lens for a second object distance at the same visual point by the astigmatic effect generated by the second diffraction order; and
    optimizing the provided lens such that the deviation of the value of at least one optical property of the ophthalmic lens from a nominal value is minimized, at least at one evaluation location of the lens, wherein the at least one optical property includes the astigmatism of the lens.

12. The method according to claim 11, wherein the at least one optical property of the lens includes further at least one of the chromatic aberration, the refraction error or the prism of the lens.

13. The method according to claim 11, wherein the optimization of the provided lens includes a minimization of the target function $$F = \Sigma_{i,\lambda,v} g_Z(i,\lambda,v)(Z_\Delta(i,\lambda,v) - Z_{\Delta,Nominal}(i,\lambda,v))^2 + g_S(i,\lambda,v)(S_\Delta(i,\lambda,v) - S_{\Delta,Nominal}(i,\lambda,v))^2,$$

wherein $S_\Delta(i,\lambda,v)$ designates the refraction error of the spherical equivalent at the i-th evaluation location for the wavelength $\lambda$, and the diffraction order $v$;

$S_{\Delta,Nominal}(i,\lambda,v)$ designates the nominal value of the refraction error at the i-th evaluation location for the wavelength $\lambda$, and the diffraction order $v$;

$Z(i,\lambda,v)$ designates the magnitude of the astigmatic deviation at the i-th evaluation location for the wavelength $\lambda$, and the diffraction order $v$;

$Z_{\Delta,Nominal}(i,\lambda,v)$ designates the nominal value of the magnitude of the astigmatic deviation at the i-th evaluation location for the wavelength $\lambda$, and the diffraction order v;

$g_S(i,\lambda,v)$ designates the weighting of the refraction error at the i-th evaluation location for the wavelength $\lambda$, and the diffraction order v; and $g_Z(i,\lambda,v)$ designates the weighting of the magnitude of the astigmatic deviation at the i-th evaluation location for the wavelength $\lambda$, and the diffraction order v.

14. The method according to claim 13, wherein the weightings of different diffraction orders are a monotonically increasing function of the diffraction efficiency given identical evaluation location and identical wavelength.

15. A device to produce an ophthalmic lens for presbyopia correction, comprising:

means to provide an ophthalmic lens to be optimized, said lens comprising:

at least one diffractive structure, wherein the diffractive structure has at least one region of variable diffraction efficiency in which the diffraction efficiency of at least one diffraction order of the diffractive structure that contributes to the focal power of the lens varies depending on the visual point on the ophthalmic lens, wherein the diffractive structure has an astigmatic diffractive power that at least partially compensates for the unwanted astigmatism of the refractive part of the ophthalmic lens, and is designed to generate at least two diffraction orders situated orthogonal to one another, and wherein the diffractive structure is also designed to entirely or at least partially compensate for the unwanted astigmatism of the refractive part of the ophthalmic lens for a first object distance at a visual point by the astigmatic effect generated by the first diffraction order; and to entirely or at least partially compensate for the unwanted astigmatism of the refractive part of the ophthalmic lens for a second object distance at the same visual point by the astigmatic effect generated by the second diffraction order; and optimization means which are designed to optimize the lens to be optimized such that the deviation of the value of at least one optical property of the ophthalmic lens is minimized at least at one evaluation location of the lens, wherein the at least one optical property includes the astigmatism of the lens.

\* \* \* \* \*